US012577410B2

(12) United States Patent (10) Patent No.: US 12,577,410 B2

Oya et al. (45) Date of Patent: Mar. 17, 2026

(54) RHEOLOGY CONTROL AGENTS FOR WATER-BASED RESINS AND WATER-BASED PAINT COMPOSITIONS

(71) Applicant: KUSUMOTO CHEMICALS, LTD., Tokyo (JP)

(72) Inventors: Noriyuki Oya, Saitama (JP); Yuki Nakanishi, Saitama (JP)

(73) Assignee: KUSUMOTO CHEMICALS, LTD., Tokyo (JP)

( * ) Notice: Subject to any disclaimer, the term of this patent is extended or adjusted under 35 U.S.C. 154(b) by 452 days.

(21) Appl. No.: 18/035,522

(22) PCT Filed: Nov. 8, 2021

(86) PCT No.: PCT/JP2021/041013
§ 371 (c)(1),
(2) Date: May 5, 2023

(87) PCT Pub. No.: WO2022/097747
PCT Pub. Date: May 12, 2022

(65) Prior Publication Data
US 2024/0059906 A1 Feb. 22, 2024

(30) Foreign Application Priority Data

Nov. 6, 2020 (JP) ................................. 2020-186155

(51) Int. Cl.
| | |
|---|---|
| *C09D 5/04* | (2006.01) |
| *C09D 7/20* | (2018.01) |
| *C09D 7/45* | (2018.01) |
| *C09D 7/63* | (2018.01) |
| *C09D 7/65* | (2018.01) |
| *C09D 163/00* | (2006.01) |

(52) U.S. Cl.
CPC ................. *C09D 5/04* (2013.01); *C09D 7/20* (2018.01); *C09D 7/45* (2018.01); *C09D 7/63* (2018.01); *C09D 7/65* (2018.01); *C09D 163/00* (2013.01)

(58) Field of Classification Search
None
See application file for complete search history.

(56) References Cited

U.S. PATENT DOCUMENTS

| | | | |
|---|---|---|---|
| 5,994,494 | A | 11/1999 | Wakui |
| 2012/0125235 | A1 | 5/2012 | Azeyanagi et al. |
| 2016/0168079 | A1 | 6/2016 | Bernard |
| 2018/0223076 | A1 | 8/2018 | Bernard et al. |
| 2022/0135798 | A1 | 5/2022 | Nakano et al. |

FOREIGN PATENT DOCUMENTS

| | | |
|---|---|---|
| JP | H10-310726 A | 11/1998 |
| JP | H11-199854 A | 7/1999 |
| JP | 2002-146336 A | 5/2002 |
| JP | 2009-233508 A | 10/2009 |
| JP | 2010-132723 A | 6/2010 |
| JP | 2012-111832 A | 6/2012 |
| JP | 2016-530245 A | 9/2016 |
| WO | 2020/158252 A1 | 8/2020 |

OTHER PUBLICATIONS

Supplementary European Search Report mailed Sep. 19, 2024, in European Application No. 21889298.2, 9 pages.
International Search Report and Written Opinion mailed on Dec. 28, 2021, received for PCT Application PCT/JP2021/041013, filed on Nov. 8, 2021, 9 pages including English Translation.

*Primary Examiner* — Katarzyna I Kolb

(74) *Attorney, Agent, or Firm* — XSENSUS LLP

(57) ABSTRACT

A rheology control agent for water-based resins may include: 1 mass % or more and 30 mass % or less of an active matter (X) containing a diamide compound (A) and/or a hydrogenated castor oil (A'), the diamide compound (A) being obtained by reacting a diamine component (A1) selected from the group consisting of diamines having 2 to 12 carbon atoms with a monocarboxylic acid component (A2) selected from the group consisting of monocarboxylic acids having at least a hydroxyl group; and 5 mass % or more and 99 mass % or less of a first solvent (C) having at least one substituent selected from the group consisting of a hydroxyl group, an ether group, an ester group, an amide group and a ketone group.

11 Claims, No Drawings

RHEOLOGY CONTROL AGENTS FOR WATER-BASED RESINS AND WATER-BASED PAINT COMPOSITIONS

CROSS-REFERENCE TO RELATED APPLICATIONS

The present application is based on PCT filing PCT/JP2021/041013, filed Nov. 8, 2021, which claims priority to JP 2020-186155, filed Nov. 6, 2020, the entire contents of each are incorporated herein by reference.

TECHNICAL FIELD

The present invention relates to rheology control agents for water-based resins and water-based paint compositions.

BACKGROUND ART

Water-based paints, which are environmentally friendly paints, are being applied to a wide range of fields, and are also increasingly being used in the field of anti-corrosive paint. Many types of thixotropic agents are used in such water-based paints for the purpose of, for example, preventing pigments from settling and hard caking in the paint during storage, preventing the paint from sagging during painting, and leveling the paint surface. Examples of such thixotropic agent include anti-settling agents described in PTLs 1 and 2. PTLs 1 and 2 disclose an anti-settling agent for water-based paints, the anti-settling agent being prepared by providing a polyamide or the like obtained by reacting a diamine with an excess of dicarboxylic acid or the like relative to the diamine, neutralizing the polyamide or the like with a neutralizing base (such as an amine), and then dispersing the polyamide or the like in a medium mainly composed of water.

However, when the neutralizing base is used as described in PTLs 1 and 2, adding an amide-based water-based rheology control agent neutralized with a base such as an amine to a water-based primer epoxy paint (Part A) used in the field of anti-corrosive paint causes a problem of gelation due to a reaction between the epoxy resin and the amine for neutralizing agent. Further, in a water-based primer epoxy paint, the pH of Part A is in the range from acidic to neutral, but it becomes basic when the Part A is mixed with an amine used as a curing agent (Part B). Therefore, there has been a demand for a rheology control agent for water-based resins that exhibits an anti-settling effect, anti-sagging effect, and the like in a wide pH range from acidic to basic. In addition, even when a water-based paint other than the water-based primer epoxy paint is used, the use of a neutralizing base such as an amine causes a problem of unpleasant odor (such as amine odor), and improvement is also desired in this respect.

As an example of the thixotropic agent that does not use a neutralizing base described above, PTL 3 discloses a paste-like thixotropic agent containing no granular products, the thixotropic agent being obtained by dispersing fine particles of a diamide compound, which is a condensation reaction product of a hydrogenated castor oil fatty acid and a primary diamine, in a mixed solvent composed of an alcohol-based solvent and at least one solvent selected from the group consisting of cyclic saturated hydrocarbons and esters, and applying a heating treatment to the dispersion. According to the paste-like thixotropic agent, an amide-based paste-like thixotropic agent, in which granular substances which may cause a problem such as poor dispersion are not contained in the paste, is provided.

As another example of the thixotropic agent that does not use a neutralizing base, PTL 4 discloses a polyurethane-based thickener (urethane thickener) composed of polyoxy-alkylene glycol and polyisocyanate. Such a urethane thickener described in PTL 4 is typically used for water-based paints.

CITATION LIST

Patent Literature

PTL 1: JP H10-310726 A
PTL 2: JP 2012-111832 A
PTL 3: JP 2002-146336 A
PTL 4: JP H11-199854 A

SUMMARY OF THE INVENTION

Technical Problem

The paste-like thixotropic agent described in PTL 3, however, uses a non-aqueous solvent such as a cyclic saturated hydrocarbon or an ester, and the thixotropic agent using such a non-aqueous solvent is not easily dispersed in water-based resin solutions used for water-based paints. Therefore, the thixotropic agent of PTL 3 is difficult to use as a rheology control agent for water-based paints (water-based resin solutions).

In addition, the urethane thickener described in PTL 4 has a problem that it is inferior to amide-based rheology control agents in the effects such as thickening effect, shear thinning property and thermal stability.

The present invention has been made in view of the above circumstances, and aims to provide a rheology control agent for water-based resins, the rheology control agent being capable of reducing the amount of neutralizing base used in the rheology control agent, and enhancing the thickening effect, shear thinning property and thermal stability while exhibiting these effects in a wide pH range from acidic to basic, and provide a water-based paint composition containing the rheology control agent.

Solution to the Problem

As a result of intensive research to achieve the above objects, the present inventors have found that containing a diamide compound having a specific structure and a solvent having a specific structure in the rheology control agent for water-based resins makes it possible to reduce the amount of neutralizing base used in the rheology control agent, and enhance the thickening effect, shear thinning property and thermal stability while exhibiting these effects in a wide pH range from acidic to basic. The present invention has been made based on these findings.

That is, the present invention is a rheology control agent for water-based resins, the rheology control agent including: 1 mass % or more and 30 mass % or less of an active matter (X) containing a diamide compound (A) and/or a hydrogenated castor oil (A'), the diamide compound (A) being obtained by reacting a diamine component (A1) selected from the group consisting of diamines having 2 to 12 carbon atoms with a monocarboxylic acid component (A2) selected from the group consisting of monocarboxylic acids having at least a hydroxyl group; and 5 mass % or more and 99 mass % or less of a first solvent (C) having at least one substituent selected from the group consisting of a hydroxyl group, an ether group, an ester group, an amide group and a ketone group, wherein a total content of the diamide compound (A) and the hydrogenated castor oil (A') is 60 parts by mass or more when a total amount of the active matter (X) is 100 parts by mass.

In one aspect of the present invention, the active matter (X) may further contain a polyamide compound (B) obtained by reacting a diamine component (B1) with an excess of a dicarboxylic acid component (B2) relative to the diamine component (B1), the polyamide compound (B) may have an acid value of 30 or more and 140 or less, and a content of the polyamide compound (B) may be 40 parts by mass or less when a total amount of the active matter (X) is 100 parts by mass.

In another aspect of the present invention, it is preferred that the first solvent (C) is a solvent having an HLB value, as calculated by the Davis method, of 3 or more and 10 or less. In still another aspect of the present invention, it is preferred that the first solvent (C) is at least one solvent selected from the group consisting of alcohol-based solvents, glycol-based solvents, diglycol-based solvents, triglycol-based solvents, ester-based solvents and amide-based solvents.

In another aspect of the present invention, the rheology control agent may further include a nonionic surfactant (E) having an HLB value, as calculated by the Griffin method, of 3 or more and 18.5 or less, wherein a content of the surfactant (E) may be 300 parts by mass or less when the diamide compound (A) and/or the hydrogenated castor oil (A') is 100 parts by mass.

In another aspect of the present invention, the rheology control agent may further include a second solvent (F) having higher polarity than the first solvent (C), wherein a content of the second solvent (F) may be 20 mass % or less.

In another aspect of the present invention, the rheology control agent may further include water (D), wherein a content of the water (D) may be 80 mass % or less.

Furthermore, the present invention is a water-based paint composition including: a water-based resin, a pigment; and the above-mentioned rheology control agent for water-based resins.

In another aspect of the present invention, a content of the active matter (X) in the rheology control agent for water-based resins may be 0.1 mass % or more and 1.0 mass % or less of a total solid content of the water-based paint composition.

Advantageous Effects of the Invention

According to the present invention, containing a diamide compound having a specific structure and a solvent having a specific structure in the rheology control agent for water-based resins makes it possible to reduce the amount of neutralizing base used in the rheology control agent, enhance the thickening effect, shear thinning property to a water-based paint containing the rheology control agent, and enhance the thermal stability of the water-based paint while exhibiting these effects in a wide pH range from acidic to basic.

DESCRIPTION OF THE EMBODIMENTS

In the following description, preferred embodiments of the present invention will be described in detail.

[Rheology Control Agent]

A rheology control agent according to the present invention is an additive for use with a water-based resin in a water-based paint composition, the rheology control agent including, as essential components, an active matter (X) containing a diamide compound (A) and/or a hydrogenated castor oil (A'); and a first solvent (C). According to the present invention, it is possible to reduce the amount of neutralizing base used in the rheology control agent, enhance the thickening effect, shear thinning property to a water-based paint containing the rheology control agent, and enhance the thermal stability of the water-based paint while exhibiting these effects in a wide pH range from acidic to basic.

Here, the thickening effect in the present invention refers to the effect of increasing (thickening) viscosity of a water-based paint containing the rheology control agent. Further, the shear thinning property in the present invention refers to the effect of reducing viscosity of a water-based paint containing the rheology control agent when subjected to a shear stress. Furthermore, the thermal stability in the present invention refers to properties in which a change in anti-settling properties with a change in temperature is small. In the following description, the essential components and optional components included in the rheology control agent according to the present invention will be described in detail. (Active Matter (X))

The active matter (X) according to the present invention is an active ingredient that is added to thickening, shear thinning of a water-based paint composition containing a rheology control agent and to enhance thermal stability of the water-based paint composition. The active matter (X) contains, as an essential component, at least one of the diamide compound (A) and the hydrogenated castor oil (A'). Further, the active matter (X) contains, as an optional component, the polyamide compound (B). That is, the active matter (X) contained in the rheology control agent according to the present invention may contain: (1) only the diamide compound (A); (2) only the hydrogenated castor oil (A'); (3) a combination of the diamide compound (A) and the hydrogenated castor oil (A'); (4) a combination of the diamide compound (A) and the polyamide compound (B); (5) a combination of the hydrogenated castor oil (A') and the polyamide compound (B); or (6) a combination of the diamide compound (A), the hydrogenated castor oil (A') and the polyamide compound (B). From the perspective of improving thermal stability, it is preferred that at least the diamide compound (A) is contained in the active matter (X) as shown in the examples described later.
<Diamide Compound (A)>

The diamide compound (A) according to the present invention is a fatty acid diamide obtained by reacting a diamine component (A1) with a monocarboxylic acid component (A2).

Raw materials for obtaining the diamide compound (A) according to the present invention include a diamine component (A1) selected from the group consisting of diamines with 2 to 12 carbon atoms, and a monocarboxylic acid component (A2) selected from the group consisting of linear saturated fatty acids having at least a hydroxyl group. Examples of the diamine component (A1) and the monocarboxylic acid component (A2) include compounds exemplified below. The reaction conditions (reaction temperature, formulation ratio of the components, and the like) may be set as appropriate by a known method. As necessary, a dehydration aid such as xylene may be used.

5

<<Diamine Component (A1)>>

Examples of the diamine component (A1) according to the present invention include: aliphatic diamines such as ethylenediamine (EDA), propylene diamine, tetramethylenediamine (TMDA), hexamethylenediamine (HMDA), octamethylenediamine (OMDA) and dodecamethylenediamine (DMDA); aromatic diamines such as orthoxylenediamine, metaxylenediamine (MXDA), paraxylenediamine (PXDA), diaminodiphenylmethane, diaminodiphenyl ether, diaminodiphenyl sulfone and methylenebischloroaniline; and cycloaliphatic diamines such as piperazine and isophorone diamine.

By using a hydroxyl group-containing diamide obtained by reacting these diamines with a monocarboxylic acid having at least a hydroxyl group, described later, as a main component of the diamide compound (A), sufficient thickening effect, shear thinning property and thermal stability can be achieved. In order to further enhance the thickening effect, shear thinning property and thermal stability effect, linear or branched diamines (e.g., EDA, TMDA, HMDA, OMDA, DMDA, etc.), among the diamines described above, are preferably used as the diamine component (A1). Further, from the perspective of enhancing the anti-settling properties, diamines with 10 or fewer carbon atoms are preferably used as the diamine component (A1).

<<Monocarboxylic Acid Component (A2)>>

The monocarboxylic acid component (A2) according to the present invention is not particularly limited as long as it contains a monocarboxylic acid having at least a hydroxyl group. Examples of the monocarboxylic acid having a hydroxyl group include: compounds in which at least one of the hydrogen atoms of saturated aliphatic monocarboxylic acids, such as acetic acid, propionic acid, butyric acid, valeric acid, caproic acid, enanthic acid, caprylic acid, pelargonic acid, capric acid, lauric acid, myristic acid, palmitic acid, stearic acid, arachidic acid and behenic acid, is substituted with hydroxyl groups; and compounds in which at least one of the hydrogen atoms of unsaturated aliphatic monocarboxylic acids, such as oleic acid, linoleic acid, ricinoleic acid, linolenic acid, eicosenoic acid, erucic acid and mixed fatty acids obtained from natural fats and oils (tall oil fatty acid, rice bran fatty acid, soybean oil fatty acid, tallowate, etc.) is substituted with hydroxyl groups.

In order to enhance the thickening effect, shear thinning property and thermal stability effect of the rheology control agent according to the present invention, it is preferred to at least contain a hydrogenated castor oil fatty acid such as 12-hydroxystearic acid (hereinafter, referred to as a "12-HSA") obtained by saponifying and decomposing hydrogenated castor oil as the monocarboxylic acid component (A2). Further, when an alkanoic acid is contained as a raw material of the diamide compound (A), the alkanoic acid preferably has 16 or fewer carbon atoms from the perspective of enhancing thermal stability.

Preferably, a reaction molar ratio (A1/A2) of the diamine component (A1) to the monocarboxylic acid component (A2) when synthesizing the diamide compound (A) is 1:2 for preventing unreacted groups from remaining. The reaction molar ratio (A1/A2) refers to the ratio (molar ratio) of the amount of the diamine component (A1) to the amount of the monocarboxylic acid component (A2).

<Hydrogenated Castor Oil (A')>

The hydrogenated castor oil (A') is a triglyceride of a saturated fatty acid obtained by hydrogenating castor oil, and is a compound having no ethylene oxide (EO) chain. The hydrogenated castor oil (A') may be a commercially available product, and examples thereof include C-WAX (manufactured by Kokura Synthetic Industries, Ltd.), KAO WAX 85P (manufactured by Kao Corporation), and Hydrogenated castor oil (Yamakei Industries Co., Ltd.).

<Polyamide Compound (B)>

The active matter (X) according to the present invention contains, as an essential component, at least one of the diamide compound (A) and the hydrogenated castor oil (A') described above, and may further contain, as an optional component, the polyamide compound (B). The polyamide compound (B) is a polyamide obtained by reacting a diamine component (B1) with an excess of a dicarboxylic acid component (B2) relative to the diamine component (B1).

The polyamide compound (B) may be a polyamide having any chemical structure as long as it is a polymer compound obtained by reacting the diamine component (B1) with the dicarboxylic acid component (B2) described above, and having an amide bond (—CONH—). The reaction conditions (reaction temperature, formulation ratio of the components, and the like) may be set as appropriate by a known method. As necessary, a dehydration aid such as xylene may be used. In this process, a reaction molar ratio (B1/B2) between the diamine component (B1) and the dicarboxylic acid component (B2) is preferably less than 1. That is, it is preferred that an excess (molar ratio) of the carboxylic acid component (B2) is reacted with the amine component (B1). In this case, at least one terminal of the polyamide compound (B) is a carboxyl group. However, in order to obtain the effects required in the present invention, it is not necessarily required that at least one terminal of the polyamide compound (B) is a carboxyl group, but all the terminals may be amino groups. Further, the reaction molar ratio (B1/B2) refers to the ratio (molar ratio) of the amount of the amine component (B1) to the amount of the carboxylic acid component (B2).

<<Diamine Component (B1)>>

As the diamine component (B1), at least one amine selected from the group consisting of diamines with 2 to 12 carbon atoms can be used. Examples of the above diamines include: aliphatic diamines such as ethylenediamine (EDA), propylene diamine, tetramethylenediamine (TMDA), hexamethylenediamine (HMDA), octamethylenediamine (OMDA) and dodecamethylenediamine (DMDA); aromatic diamines such as xylylene diamine, diaminodiphenyl ether and diaminodiphenyl sulfone; and cycloaliphatic diamines such as piperazine and isophorone diamine. These compounds used as the diamine component (B1) can be used singly or as a mixture of two or more.

<<Dicarboxylic Acid Component (B2)>>

As the dicarboxylic acid component (B2), for example, at least one carboxylic acid selected from the group consisting of dicarboxylic acids with 4 to 36 carbon atoms can be used. Examples of the dicarboxylic acids include succinic acid, glutaric acid, adipic acid, pimelic acid, suberic acid, azelaic acid, sebacic acid, dodecanedioic acid, maleic acid, fumaric acid, phthalic acid, isophthalic acid, terephthalic acid, dimer acids, and the like. Dimer acids are polymerized fatty acids obtained by polymerizing (dimerizing) unsaturated fatty acids (for example, unsaturated fatty acids having 18 or 22 carbon atoms) obtained from vegetable oil such as soybean oil, tall oil, linseed oil, cottonseed oil, or the like. Typically, dimer acids having 36 carbon atoms are commercially available. Although commercially available dimer acids contain monomer acids and trimer acids in addition to dimer acids, those having high dimer acid content are preferred. These compounds used as the dicarboxylic acid component (B2) can be used singly or as a mixture of two or more.

In order to enhance the thickening effect, shear thinning property to the water-based paint composition containing the rheology control agent according to the present invention and enhance the thermal stability effect of the water-based paint composition, the dicarboxylic acid component (B2) preferably contains at least polymerized fatty acids. The polymerized fatty acids used as the dicarboxylic acid component (B2) of the present invention are polymers obtained by polymerizing a monobasic fatty acid having an unsaturated bond or polymers obtained by polymerizing an ester of a monobasic fatty acid having an unsaturated bond. The monobasic fatty acid having an unsaturated bond may be typically an unsaturated fatty acid having 1 to 3 unsaturated bonds and having 8 to 24 total carbon atoms. Examples of the unsaturated fatty acid include oleic acid, linoleic acid, linolenic acid, natural drying oil fatty acids, natural semi-drying oil fatty acids, and the like. The ester of a monobasic fatty acid having an unsaturated bond may be an ester of the monobasic fatty acid having an unsaturated bond and an aliphatic alcohol, preferably an aliphatic alcohol having 1 to 3 carbon atoms. Among these polymerized fatty acids, dimer acids are particularly preferred as the dicarboxylic acid component (B2).

<<Physical Properties of Polyamide Compound (B)>>

The polyamide compound (B) according to the present invention preferably has an acid value of 30 or more and 140 or less. By setting the acid value of the polyamide compound (B) within the above range, the rheology control agent according to the present invention can further enhance the thickening effect, shear thinning property to the water-based paint and enhance the effect of improving thermal stability of the water-based paint. When the acid value of the poly-amide compound (B) is less than 30, the polyamide compound (B) becomes too hydrophobic and may be difficult to disperse in the water-based paint composition, and when the acid value is more than 140, synthesis of the polyamide may be difficult.

The acid value described herein can be measured according to JIS K 0070-1992. Further, the acid value refers to the quantity in mg of potassium hydroxide required to neutralize free fatty acids and the like contained in 1 g of a sample. Methods of measuring the acid value include a neutralization titration method and a potentiometric titration method, but the acid value described herein is a value measured by the neutralization titration method.

<Content Ratio of Diamide Compound (A) and Hydrogenated Castor Oil (A')>

In the active matter (X) according to the present invention, the total content of the diamide compound (A) and the hydrogenated castor oil (A') should be 60 parts by mass or more when the total amount of the active matter (X) is 100 parts by mass. Further, when the active matter (X) contains the polyamide compound (B), the content of the polyamide compound (B) is preferably 40 parts by mass or less. In other words, the ratio [Q(A+A'):Q(B)] of the total content Q(A+A') of the diamide compound (A) and the hydrogenated castor oil (A') to the content Q(B) of the polyamide compound (B) in the active matter (X) is in the range of 60:40 to 100:0.

<Content of Active Matter (X)>

The content of the active matter (X) in the rheology control agent according to the present invention is 1 mass % or more and 30 mass % or less. When the content of the active matter (X) is less than 1 mass %, the rheology control agent may not achieve the thickening effect, shear thinning property to the water-based paint composition. On the other hand, when the content of the active matter (X) is more than 30 mass %, the active matter (X) has poor dispersibility in a medium mainly composed of water, which may reduce the anti-settling properties and thermal stability of the water-based paint composition. From the perspective of enhancing the anti-sagging properties, the content of the active matter (X) is preferably 3.0 mass % or more and 20.0 mass % or less, and more preferably 3.0 mass % or more and 15.0 mass % or less.

(Neutralizing Base (G))

In the rheology control agent according to the present invention, it is not prohibited to use neutralizing bases such as amines for dispersing the polyamide compound (B) in a medium mainly composed of water (that is, as a hydro-philization aid for facilitating hydrophilization of the poly-amide compound (B)). However, as described above, when the neutralizing base is used, adding the rheology control agent containing a polyamide neutralized with an amine to a water-based primer epoxy paint (Part A) used in the field of anti-corrosive paint causes a problem of gelation due to a reaction between the epoxy resin (Part A) and the amine for neutralizing agent. Therefore, the neutralizing base (G) content is preferably as small as possible. From the above viewpoint, the neutralizing base (G) content in the rheology control agent may be preferably, for example, 2 mass % or less, and more preferably, substantially no neutralizing base (G) is contained.

The neutralizing base (G) may be an organic base or an inorganic base. Examples of the organic base include alky-lamines such as ethylamine, diethylamine and triethylamine, alkanolamine such as ethanolamine, diethanolamine, trietha-nolamine and N,N'-dimethylethanolamine, and the like. Examples of the inorganic base include sodium hydroxide, potassium hydroxide, ammonia, and the like. These may be used singly or in combination of two or more.

(First Solvent (C))

The rheology control agent for water-based resins accord-ing to the present invention contains, as an essential com-ponent, the first solvent (C) in addition to the above active matter (X). The first solvent (C) is used to facilitate disper-sion of the active matter (X) in a medium mainly composed of water. By mixing the active matter (X) with the first solvent (C) and applying heat-treatment to the mixture, the thickening effect, shear thinning property to the water-based paint composition can be exhibited. That is, the first solvent (C) is used as an activation aid that facilitates the active matter (X) to exhibit the thickening effect, shear thinning property (activation of the active matter (X)).

As the first solvent (C), a solvent having at least one substituent selected from the group consisting of a hydroxyl group, an ether group, an ester group, an amide group and a ketone group can be used. Examples of the first solvent (C) include alcohol-based solvents, glycol-based solvents, diglycol-based solvents, triglycol-based solvents, ester-based solvents and amide-based solvents. Examples of the alcohol-based solvents include aliphatic alcohols such as methanol, ethanol, propanol, butanol, isobutanol, isopropa-nol, pentanol, hexanol, heptanol, octanol and 2-ethylhexa-nol, cyclic alcohols such as benzyl alcohol, and the like. Examples of the glycol-based solvents include ethylene glycol monomethyl ether, ethylene glycol monoisopropyl ether, ethylene glycol monobutyl ether, ethylene glycol monoisobutyl ether, ethylene glycol monohexyl ether, 2-eth-ylhexyl glycol, propylene glycol monomethyl ether, propyl-ene glycol monopropyl ether, propylene glycol monobutyl ether, phenyl glycol, and the like. Examples of the diglycol-based solvents include diethylene glycol monomethyl ether, diethylene glycol monoethyl ether, diethylene glycol monobutyl ether, dipropylene glycol monomethyl ether, dipropylene glycol monobutyl ether, and the like. Examples of the triglycol-based solvents include triethylene glycol monomethyl ether, triethylene glycol monobutyl ether, and the like. Examples of the ester-based solvents include dibasic esters such as methyl glutarate, methyl succinate and methyl adipate; propylene glycol monomethyl acetate, amyl propionate, ethyl ethoxypropionate, 2,2,4-trimethyl pentanediol monoisobutyrate, and the like. Examples of the amide-based solvents include acyclic amides such as dimethylformamide, diethylformamide, dimethylacetamide, 3-methoxy-N,N-dimethylpropanamide and hexamethylphosphoramide, cyclic amides such as N-methylpyrrolidone, and the like. Examples of the solvent (C) further include polyhydric alcohols such as ethylene glycol, propylene glycol, butylene glycol, glycerin, sorbitol, xylitol, and the like. The above solvents can be used singly or in combination of two or more.

From the perspective of further enhancing the effect of adding the first solvent (C) (thickening effect, shear thinning property, and the like), the first solvent (C) is preferably a solvent having an HLB value of 3 or more and 10 or less. Examples of such a solvent include ethylhexanol, butanol, 2-ethylhexyl glycol, phenyl glycol, propylene glycol monobutyl ether, ethylene glycol monobutyl ether, propylene glycol monomethyl ether, dipropylene glycol monobutyl ether, diethylene glycol monobutyl ether, dipropylene glycol monomethyl ether, diethylene glycol monoethyl ether, triethylene glycol monobutyl ether, triethylene glycol monomethyl ether, 2,2,4-trimethyl pentanediol monoisobutyrate, propylene glycol monomethyl acetate, and the like. As the HLB value of the first solvent (C), a value calculated by the Davis method is used.

The content of the first solvent (C) in the rheology control agent according to the present invention is 5 mass % or more and 99 mass % or less. When the content of the first solvent (C) is less than 5 mass %, the rheology control agent may not achieve the thickening effect and shear thinning property to the water-based paint composition, and may not achieve the effect of improving thermal stability of the water-based paint composition. On the other hand, although the upper limit of the content of the first solvent (C) is not particularly limited, the content of the first solvent (C) is 99 mass % or less since the rheology control agent according to the present invention contains, as an essential component, 1 mass % or more of the active matter (X). From the perspective of improving the thermal stability, the content of the first solvent (C) is preferably 10 mass % or more and 99 mass % or less.

(Water (D))

The rheology control agent according to the present invention is for water-based resins, and is obtained by dispersing the active matter (X) as an active ingredient and the like in a medium mainly composed of water. For example, deionized water can be used as water (D). The water (D) is not an essential component of the rheology control agent according to the present invention (that is, the water (D) may not necessarily be contained in the rheology control agent), but the use of the water (D) can reduce the content of the first solvent (C), which is preferably as small as possible in view of the impact on the environment and human health. However, when the content of the water (D) is too large, the required amount of the active matter (X) and the solvent (C) may not be contained in the rheology control agent. Therefore, the content of the water (D) is preferably 80 mass % or less of the total mass of the rheology control agent.

(Surfactant (E))

The rheology control agent according to the present invention may contain, as an optional component, a surfactant (E). The surfactant (E) is used as a hydrophilization aid for hydrophilizing the active matter (X) and facilitating dispersion of the active matter (X) in a medium mainly composed of water. Examples of the surfactant (E) include polyoxyethylene hydrogenated castor oil, polyoxyethylene castor oil, polyoxyethylene alkyl ethers such as polyoxyethylene stearyl ether, polyoxyethylene 2-ethylhexyl ether and polyoxyethylene styrenated phenyl ether, polyoxyethylene glycerin fatty acid esters such as polyoxyethylene hydrogenated castor oil monoisostearate, polyoxyethylene hydrogenated castor oil triisostearate and polyoxyethylene glyceryl monoisostearate, polyoxyethylene sorbitan aliphatic esters such as polyoxyethylene sorbitan monostearate, polyoxyethylene oxypropylene copolymers, and the like.

As for the type of the surfactant (E) used in the present invention, nonionic surfactants can exhibit excellent anti-settling properties and thermal stability. From the perspective of further enhancing the effect of adding the surfactant (E) (effect of facilitating dispersion of the active matter (X)) and enhancing the anti-sagging properties, nonionic surfactants having an HLB value of 3 or more and 18.5 or less are preferably used as the surfactant (E). As the HLB value of the surfactant (E), a value calculated by the Griffin method is used. Also, from the perspective of enhancing the anti-sagging properties, compounds containing no aromatic ring are preferably used as the surfactant (E).

When the compounds exemplified above are used as the surfactant (E), the number of moles of ethylene oxide (EO) is preferably 3 mol or more and 200 mol or less. From the perspective of enhancing the anti-sagging properties of the water-based paint containing the rheology control agent according to the present invention, the number of moles of the added EO is preferably 10 mol or more and 200 mol or less, and more preferably 10 mol or more and 100 mol or less. On the other hand, from the perspective of improving the storage stability of the water-based paint containing the rheology control agent according to the present invention, the number of moles of the added EO is preferably 10 mol or more and 200 mol or less.

The content of the surfactant (E) according to the present invention is preferably 300 parts by mass or less when the diamide compound (A) and/or the hydrogenated castor oil (A') is 100 parts by mass. By setting the content of the surfactant (E) within the above range, the effect of adding the surfactant (E) (effect of facilitating dispersion of the active matter (X)) can be further enhanced. In particular, from the perspective of enhancing the storage stability of the paint and anti-sagging properties, the content of the surfactant (E) is more preferably 200 parts by mass or less when the diamide compound (A) and/or the hydrogenated castor oil (A') is 100 parts by mass. From the perspective of particularly enhancing the anti-sagging properties, the content of the surfactant (E) is preferably 40 parts by mass or more when the diamide compound (A) and/or the hydrogenated castor oil (A') is 100 parts by mass.

(Second Solvent (F))

The rheology control agent according to the present invention may contain, as an optional component, a second solvent (F). The second solvent (F) is used to enhances dispersibility of the rheology control agent in the water-based paint composition. As the second solvent (F), a solvent different from the first solvent (C) and having higher polarity than the first solvent (C) is used. Examples of the second solvent (F) include alcohol, polyhydric alcohol, glycol, diglycol, triglycol, and the like. Examples of the alcohol include aliphatic alcohols such as methanol, ethanol, propanol, butanol, isobutanol, isopropanol, pentanol, hexanol, heptanol, octanol and 2-ethylhexanol, cyclic alcohols such as benzyl alcohol, and the like. Examples of the polyhydric alcohol include ethylene glycol, propylene glycol, butylene glycol, butanediol, diethylene glycol, glycerin, sorbitol, xylitol, and the like. Examples of the glycol include ethylene glycol monomethyl ether, ethylene glycol monoethyl ether, ethylene glycol monoisopropyl ether, ethylene glycol monobutyl ether, ethylene glycol monoisobutyl ether, ethylene glycol monohexyl ether, 2-ethylhexyl glycol, propylene glycol monomethyl ether, propylene glycol monopropyl ether, propylene glycol monobutyl ether, phenyl glycol, and the like. Examples of the diglycol include diethylene glycol monomethyl ether, diethylene glycol monoethyl ether, diethylene glycol monobutyl ether, dipropylene glycol monomethyl ether, dipropylene glycol monobutyl ether, and the like. Examples of the triglycol include triethylene glycol monomethyl ether, triethylene glycol monobutyl ether, and the like.

The content of the second solvent (F) according to the present invention is preferably 20 mass % or less of the total mass of the rheology control agent. By setting the content of the second solvent (F) within the above range, the effect of adding the second solvent (F) (effect of improving stability of the paint) can be further enhanced. From the perspective of particularly enhancing the thermal stability, the content of the second solvent (F) is more preferably 10 mass % or less. Further, from the perspective of enhancing the anti-settling properties, the content of the second solvent (F) is more preferably 10 mass % or less, and still more preferably 5 mass % or less.

(Other Aids)

The rheology control agent for water-based resins according to the present invention may contain aids for imparting other functions. For example, various aids may be added to improve gloss retention of the coating film, dispersibility of pigments, defoaming and leveling of the water-based paint composition, and the like.

(Method of Producing Rheology Control Agent)

The rheology control agent containing the above components can be produced, for example, in the following manner. First, water (D), or, if necessary, a mixed solution in which a first solvent (C) or a second solvent (F) is mixed with water is cooled to prepare cold water or a cold solution (hereinafter, referred to as "cold water or the like"). The temperature of the cold water or the like is not particularly limited, but may be, for example, approximately 5° C. to 15° C. Meanwhile, a mixed solution in which an active matter (X) is mixed with a first solvent (C) (and a surfactant (E), if necessary) is prepared. The conditions for preparing the mixed solution are not particularly limited, but the mixing temperature is typically 90° C. to 150° C., at which the components are in a dissolved state, in order to improve mixing efficiency. When a polyamide compound (B) is contained as the active matter (X), a neutralizing base (G) is added to the mixed solution to neutralize the polyamide compound (B).

Then, while stirring the above cold water or the like, the mixed solution prepared as described above is gradually added to the cold water or the like. Subsequently, if necessary, a solution in which the surfactant (E) is diluted with the first solvent (C) is added to the cold water or the like to which the mixed solution has been added to thereby obtain a water-based dispersion of the active matter (X).

After all the components are added, the dispersion obtained as described above is transferred to a container, and the dispersion is subjected to a heating treatment. The heating treatment promotes generation of composite fibrous particles composed of the active matter (X) and the first solvent (C), which enhances the anti-settling effect. The heating temperature in the heating treatment to the dispersion is not particularly limited, but is preferably 45° C. to 90° C., and more preferably 50° C. to 90° C. Further, the heating treatment time of the dispersion is not particularly limited, but is preferably 5 hours to 60 hours, and more preferably 10 hours to 48 hours.

(Applications of Rheology Control Agent)

The suitable applications of the rheology control agent according to the present invention are not particularly limited as long as it is added to water-based paints together with water-based resins. For example, the rheology control agent according to the present invention can be suitably used for water-based metallic paints in which pearl pigments such as aluminum pigments and mica are used or water-based anti-corrosive paints in which pigments having a large particle size and a high specific gravity, such as anti-corrosive pigments, are used. Further, the rheology control agent according to the present invention can also be suitably used for water-based paints in which general color pigments or extender pigments other than those described above are used or water-based coating materials such as water-based ink.

[Water-Based Paint Composition]

The water-based paint composition according to the present invention contains, as essential components, a water-based resin, a pigment, and the above-mentioned rheology control agent for water-based resins. The water-based paint composition according to the present invention may further contain, as optional components, other additives such as defoamers, film-forming agents, pH control agents, and the like.

(Content of Rheology Control Agent)

The content of the active matter (X) in the rheology control agent for water-based resins according to the present invention varies depending on the type of water-based resin which is a binder in the water-based paint composition, the formulation composition of the pigment, and the like, but is typically 0.1 mass % or more and 1.0 mass % or less of the total solid content of the water-based paint composition. The content of the rheology control agent is adjusted according to the content of the active matter (X). By setting the content of the rheology control agent within the above range, the effect of adding the rheology control agent (thickening effect and shear thinning property to the water-based paint composition and the effect of improving the thermal stability of the water-based paint composition) can be further enhanced.

(Water-Based Resin)

The water-based resin contained as a binder in the water-based paint composition according to the present invention is a dispersion in which a resin component is dispersed in a medium mainly composed of water, and examples of the resin component include acrylic-based resins, acrylic silicone resins, alkyd-based resins, polyester-based resins, urethane-based resins, epoxy-based resins, silicone resins, fluorocarbon resins, and the like. The form of the water-based resin is classified into water soluble, colloidal dispersion and emulsion depending on the dispersion form, and any form is applicable. These resins may be, for example, thermosetting type, UV-curable type, EB-curable type, oxidative curable type, photo-cationic curable type or peroxide curable type, or may be resins that cure by chemical reaction in the presence or absence of a catalyst or may be resins having high glass transition point and forming a film only by volatilizing a diluting medium without involving chemical reactions. Further, examples of curing agents include amino resins, melamine resins, isocyanate compounds, block isocyanate compounds, epoxy compounds, and the like.

(Pigment)

Examples of the pigments include extender pigments, color pigments, metallic pigments, and the like. Examples of the extender pigments include calcium carbonate (ground calcium carbonate (GCC), precipitated calcium carbonate (PCC), and the like), barium sulfate, silicon dioxide, aluminum hydroxide, talc, mica, organic fibers, glass powder, and the like. Examples of the color pigments include titanium dioxide, carbon black, chrome yellow, cadmium yellow, ocher, titanium yellow, zinc chromate, iron oxide red, aluminosilicate, quinacridone pigments, phthalocyanine pigments, anthraquinone pigments, diketopyrrolopyrrole pigments, benzimidazolone pigments, isoindolinone pigments, and the like. Examples of the metallic pigments include aluminum flakes, copper flakes, micaceous iron oxide, mica, flaky powder obtained by coating mica with a metal oxide, and the like.

(Other Additives)

The water-based paint composition of the present invention may contain other substances within a range that does not impair the characteristics thereof and purposes of the present invention. Examples of such substances include water scavengers (for example, silane coupling agents), adhesion promoters, surfactants, curing catalysts, film-forming agents, dryers, anti-fouling agents, sensitizers, antioxidants, photostabilizers, UV absorbers, water resistant agents, antiseptic and antifungal agents, defoamers, leveling agents, dispersants, flame retardants, antistatic agents, release agents, deodorants, pH control agents, fragrances, and the like.

(Method for Preparing Water-Based Paint Composition)

The water-based paint composition according to the present invention can be prepared according to known methods for preparing water-based paints. For example, components other than the rheology control agent and the pigment described above are stirred and mixed in a medium mainly composed of water such as deionized water, and then the pH is adjusted, if necessary, to prepare a clear paint. The rheology control agent and the pigment are then added and dispersed in the clear paint to prepare a water-based paint composition.

Further, for example, when producing a two-component water-based epoxy paint, components other than the rheology control agent described above are stirred and mixed in a medium mainly composed of water such as deionized water to prepare an epoxy resin (Part A). The rheology control agent is then added and dispersed in the epoxy resin (Part A) to prepare an epoxy resin (Part A) containing the rheology control agent. Then, the epoxy resin (Part A) thus prepared is mixed with a curing agent (Part B) such as an amine curing agent to prepare a water-based epoxy paint.

Conventionally, there were no rheology control agents that could exhibit thickening effect, shear thinning property and thermal stability effect in a wide pH range from acidic to basic, so the rheology control agent had to be added to the amine curing agent. By adding the rheology control agent to the amine curing agent, which is basic, the water-based epoxy paint remains basic even after the amine curing agent is mixed with the epoxy resin, and is less likely to be affected by pH changes. However, since the rheology control agent according to the present invention can exhibit a thickening effect, shear thinning property and thermal stability effect in a wide pH range from acidic to basic, the rheology control agent can be added to the epoxy resin.

Since the amine curing agent itself has high viscosity, adding the rheology control agent to the amine curing agent further increases the viscosity, resulting in poor liquid-handleability. On the other hand, since the viscosity of the epoxy resin is not higher than that of the amine curing agent, there is no disadvantage such as poor handleability as in the case where the rheology control agent is added to the amine curing agent even if the viscosity increases by adding the rheology control agent. Rather, adding the rheology control agent to the epoxy resin prevents the amine curing agent having high viscosity from becoming thickened and causes the epoxy resin having relatively low viscosity to become thickened, resulting in a decrease in the difference in viscosity between the epoxy resin and the amine curing agent compared with the case where the rheology control agent is added to the amine curing agent. Accordingly, when the epoxy resin and the amine curing agent are mixed, the difference in viscosity between the two mixed liquids decreases, facilitating mixing of the epoxy resin and the amine curing agent.

The rheology control agent according to the present invention can be added to the water-based paint at the timing when the pigment is kneaded as described above or after the water-based paint is prepared. Further, it is also possible to prepare a master batch and add it to the water-based paint. Further, the rheology control agent and the pigment can be dispersed using a device which is typically used for production of water-based paints. In addition, conditions for the stirring rate and stirring time in dispersion of the rheology control agent and the pigment are not particularly limited, and may be set as appropriate according to the dispersion state of the rheology control agent and the pigment.

(Application of Water-Based Paint Composition)

The water-based paint composition according to the present invention can be suitably used for water-based metallic paints in which pearl pigments such as aluminum pigments and mica are used or water-based anti-corrosive paints in which pigments having a large particle size and a high specific gravity, such as anti-corrosive pigments, are used. Further, the water-based paint composition according to the present invention can also be suitably used for water-based paints in which general color pigments or extender pigments other than those described above are used or water-based coating materials such as water-based ink.

Some preferred embodiments of the present invention have been described above, but the present invention is not limited to the aforementioned embodiments. That is, other embodiments or various modifications that would occur to those skilled in the art within the scope of the appended claims should be construed as being within the technical scope of the present invention.

EXAMPLES

The present invention will be specifically described below by using examples. The present invention is not limited to these examples in any manner. In the examples, "%" and "parts" indicate "mass %" and "parts by mass," respectively, unless otherwise specified.

Synthesis of Diamide Compound (A)

As described in detail below, the diamine component (A1) and the monocarboxylic acid (A2) described in Table 1 were reacted at a formulation ratio (molar ratio) described in Table 1 to obtain diamide compounds (A) of Synthesis Examples A-1 to A-6.

Synthesis Example A-1

298.6 parts (0.96 mol) of 12-hydroxystearic acid was weighed into a 1-L four-necked flask equipped with a stirrer, a temperature controller, a water trap and a nitrogen inlet tube, and dissolved by heating at 80° C. Next, 55.8 parts (0.48 mol) of hexamethylene diamine was gradually added to the four-necked flask, and then subjected to a dehydration reaction at 185° C. for 5 hours to thereby obtain a diamide compound (A) of Synthesis Example A-1 described in Table 1.

Synthesis Examples A-2 to A-6

Diamide compounds (A) of Synthesis Examples A-2 to A-6 were obtained in the same manner as in Synthesis Example A-1 except that components described in Table 1 as the diamine component (A1) and the monocarboxylic acid (A2) were reacted at the formulation ratios described in Table 1.

four-necked flask, and then stirred at 150° C. for 60 minutes. After the stirring, the mixture was gently heated to 175° C. and subjected to a dehydration reaction for 150 minutes to thereby obtain a polyamide compound (B) of Synthesis Example B-1 described in Table 2.

Synthesis Examples B-2 to B-10

Polyamide compounds (B) of Synthesis Examples B-2 to B-10 were obtained in the same manner as in Synthesis Example B-1 except that components described in Table 2 as the diamine component (B1) and the dicarboxylic acid (B2) were reacted at the formulation ratios described in Table 2.

The acid values of Synthesis Examples B-1 to B-10 obtained as described above were measured. Specifically, the acid values of the polyamide compounds (B) of Synthesis Examples B-1 to B-10 were measured by a neutralization titration method according to JIS K 0070-1992. The results are shown in Table 2.

TABLE 1

Formulation of diamide compound (A)

| Component | | [g/mol] | A-1 | A-2 | A-3 | A-4 | A-5 | A-6 |
|---|---|---|---|---|---|---|---|---|
| Diamine component (A1) | Hexamethylenediamine | 116.21 | 0.48 | — | — | — | 0.48 | 0.48 |
| | Ethylenediamine | 60.1 | — | 0.48 | — | — | — | — |
| | 1,12-dodecanediamine | 200.36 | — | — | 0.48 | — | — | — |
| | Metaxylenediamine | 136.19 | — | — | — | 0.48 | — | — |
| Monocarboxylic acid component (A2) | 12-hydroxystearic acid | 300.48 | 0.96 | 0.96 | 0.96 | 0.96 | — | — |
| | Stearic acid | 284.48 | — | — | — | — | 0.96 | — |
| | n-caproic acid | 116.13 | — | — | — | — | — | 0.96 |

Synthesis of Polyamide Compound (B)

As described in detail below, the diamine component (B1) and the dicarboxylic acid (B2) described in Table 2 were reacted at the formulation ratios (molar ratios) described in

TABLE 2

Formulation of polyamide compound (B)

| Component | | B-1 | B-2 | B-3 | B-4 | B-5 | B-6 | B-7 | B-8 | B-9 | B-10 |
|---|---|---|---|---|---|---|---|---|---|---|---|
| Diamine component (B1) | Hexamethylenediamine | 0.30 | 0.36 | 0.40 | 0.45 | 0.48 | — | — | — | 0.50 | 0.53 |
| | Ethylenediamine | — | — | — | — | — | 0.20 | — | — | — | — |
| | Dodecamethylenediamine | — | — | — | — | — | — | 0.40 | — | — | — |
| | Metaxylenediamine | — | — | — | — | — | — | — | 0.40 | — | — |
| Dicarboxylic acid component (B2) | Dimer acid | 0.60 | 0.60 | 0.60 | 0.60 | 0.60 | 0.60 | 0.60 | 0.60 | 0.60 | 0.60 |
| | Azelaic acid | — | — | — | 0.15 | — | — | — | — | — | — |
| | Adipic acid | — | — | — | — | — | — | — | — | 0.15 | — |
| Acid value | | 93 | 75 | 62 | 82 | 38 | 134 | 60 | 60 | 71 | 24 |

Table 2 to obtain polyamide compounds (B) of Synthesis Examples B-1 to B-10.

Synthesis Example B-1

354 parts (0.60 mol) of dimer acid (trade name "HARI-DIMER 250": manufactured by Harima Chemicals Group, Inc.) and 53.1 parts (15% of total carboxylic acid) of xylene were weighed into a 1-L four-necked flask equipped with a stirrer, a temperature controller, a water trap and a nitrogen inlet tube, and heated to 50° C. Next, 34.9 parts (0.30 mol) of hexamethylene diamine was gradually added to the

Preparation of Rheology Control Agent

As described in detail below, components described in Tables 3 to 6 were blended at the formulation ratios (parts by mass) described in Tables 3 to 6, and subjected to a heating treatment at the heating treatment temperatures described in Tables 3 to 6 to thereby obtain rheology control agents for water-based resins of Preparation Examples S1 to S83. Further, components described in Table 7 were blended at the formulation ratios (parts by mass) described in Table 7, and subjected to a heating treatment at the heating treatment temperatures described in Table 7 to thereby obtain rheology control agents for water-based resins of Comparative Preparation Examples H1 to H11.

Preparation Example S1

96 parts of deionized water as the water (D) and 10 parts of ethylene glycol as the second solvent (F) were weighed into a 500-mL four-necked flask equipped with a stirrer, a cooling tube and a thermometer, and cooled to 10° C. to prepare the cold water. Meanwhile, 10 parts of diamide of Synthesis Example A-1 as the diamide compound (A) and 76 parts of ethylene glycol monobutyl ether as the first solvent (C) were mixed, and then heated to 120° C. to prepare a mixed solution. Next, while stirring the above cold water, the mixed solution was gradually added to the cold water. Subsequently, 4 parts of polyoxyethylene hydrogenated castor oil (trade name "BLAUNON CW-10," manufactured by Aoki Oil Industrial Co., Ltd) having an HLB of 6.4 as the surfactant (E) was provided as a 50% solution of 4 parts of ethylene glycol monobutyl ether as the first solvent (C), and the 50% solution was gradually added to the cold water to which the mixed solution had been added. After all the 50% solution was added, the obtained dispersion was transferred to a container, and subjected to a heating treatment in a thermostatic bath at 80° C. for 24 hours to thereby obtain a rheology control agent of Preparation Example S1 shown in Table 3.

Preparation Example S2 to S8 and S71 to S83

Rheology control agents of Preparation Examples S2 to S8 and S71 to S83 were obtained in the same manner as in Preparation Example S1 except that components described in Table 3 or 6 were used as components of the rheology control agent, and these components were added at the formulation ratios described in Table 3 or 6 and subjected to a heating treatment at the heating treatment temperatures described in Table 3 or 6.

Preparation Example S9

100 parts of deionized water as the water (D) was weighed into a 500-mL four-necked flask equipped with a stirrer, a cooling tube and a thermometer, and cooled to 10° C. to prepare the cold water. Meanwhile, 14 parts of diamide of Synthesis Example A-1 as the diamide compound (A), 6 parts of polyamide of Synthesis Example B-1 as the polyamide compound (B), 4 parts of polyoxyethylene hydrogenated castor oil (trade name "BLAUNON CW-10," manufactured by Aoki Oil Industrial Co., Ltd) having an HLB of 6.4 as the surfactant (E) and 74.8 parts of ethylene glycol monobutyl ether as the first solvent (C) were mixed, and then heated to 120° C. to prepare a mixed solution. Then, 1.2 parts of N,N'-dimethylethanolamine as the neutralizing base (G) was added to the mixed solution and mixed therewith. Next, while stirring the above cold water, the mixed solution was gradually added to the cold water. After all the mixed solution was added, the obtained dispersion was transferred to a container and subjected to a heating treatment in a thermostatic bath at 80° C. for 24 hours to thereby obtain a rheology control agent of Preparation Example S9 shown in Table 3.

Preparation Example S10 to S19 and S48 to S51

Rheology control agents of Preparation Examples S10 to S19 and S48 to S51 were obtained in the same manner as in Preparation Example S9 except that components described in Table 3 or 4 were used as components of the rheology control agent, and these components were added at the formulation ratios described in Table 3 or 4 and subjected to a heating treatment at the heating treatment temperatures described in Table 3 or 4.

Preparation Examples S20

40 parts of deionized water as the water (D) and 57.6 parts of ethylene glycol monobutyl ether as the first solvent (C) were weighed into a 500-mL four-necked flask equipped with a stirrer, a cooling tube and a thermometer, and cooled to 10° C. to prepare the cold water. Meanwhile, 6 parts of the diamide of Synthesis Example A-1 as the diamide compound (A) and 91.6 parts of ethylene glycol monobutyl ether as the first solvent (C) were mixed, and then heated to 120° C. to prepare a mixed solution. Next, while stirring the above cold water, the mixed solution was gradually added to the cold water. Subsequently, 2.4 parts of polyoxyethylene hydrogenated castor oil (trade name "BLAUNON CW-10," manufactured by Aoki Oil Industrial Co., Ltd) having an HLB of 6.4 as the surfactant (E) was provided as a 50% solution of 2.4 parts of ethylene glycol monobutyl ether as the first solvent (C), and the 50% solution was gradually added to the cold water to which the mixed solution had been added. After all the mixed solution was added, the obtained dispersion was transferred to a container and subjected to a heating treatment in a thermostatic bath at 75° C. for 24 hours to thereby obtain a rheology control agent of Preparation Example S20 shown in Table 3.

Preparation Examples S21 to S23

Rheology control agents of Preparation Examples S21 to S23 were obtained in the same manner as in Preparation Example S20 except that components described in Table 3 were used as components of the rheology control agent, and these components were added at the formulation ratios described in Table 3 and subjected to a heating treatment at the heating treatment temperatures described in Table 3.

Preparation Example S24

100 parts of 2-ethylhexanol as the first solvent (C) was weighed into a 500-mL four-necked flask equipped with a stirrer, a cooling tube and a thermometer, and cooled to 10° C. to prepare a cold solvent. Meanwhile, 10 parts of the diamide of Synthesis Example A-1 as the diamide compound (A) and 90 parts of 2-ethylhexanol as the first solvent (C) were mixed, and then heated to 120° C. to prepare a mixed solution. Next, while stirring the above cold solvent, the mixed solution was gradually added to the cold solvent. After all the mixed solution was added, the obtained dispersion was transferred to a container and subjected to a heating treatment in a thermostatic bath at 85° C. for 24 hours to thereby obtain a rheology control agent of Preparation Example S24 shown in Table 4.

Preparation Examples S25 to S39

Rheology control agents of Preparation Examples S25 to S39 were obtained in the same manner as in Preparation Example S24 except that components described in Table 4 were used as components of the rheology control agent, and these components were added at the formulation ratios described in Table 4 and subjected to a heating treatment at the heating treatment temperatures described in Table 4.

Preparation Example S40

100 parts of deionized water as the water (D) was weighed into a 500-mL four-necked flask equipped with a stirrer, a cooling tube and a thermometer, and cooled to 10° C. to prepare the cold water. Meanwhile, 10 parts of diamide of Synthesis Example A-1 as the diamide compound (A) and 90 parts of dipropylene glycol monobutyl ether as the first solvent (C) were mixed, and then heated to 120° C. to prepare a mixed solution. Next, while stirring the above cold water, the mixed solution was gradually added to the cold water. After the mixed solution was added, the obtained dispersion was transferred to a container and subjected to a heating treatment in a thermostatic bath at 80° C. for 24 hours to thereby obtain a rheology control agent of Preparation Example S40 shown in Table 4.

Preparation Examples S41 to S47

Rheology control agents of Preparation Examples S41 to S47 were obtained in the same manner as in Preparation Example S40 except that components described in Table 4 were used as components of the rheology control agent, and these components were added at the formulation ratios described in Table 4 and subjected to a heating treatment at the heating treatment temperatures described in Table 4.

Preparation Example S52

96 parts of deionized water as the water (D) was weighed into a 500-mL four-necked flask equipped with a stirrer, a cooling tube and a thermometer, and cooled to 10° C. to prepare the cold water. Meanwhile, 10 parts of diamide of Synthesis Example A-1 as the diamide compound (A) and 86 parts of ethylene glycol monobutyl ether as the first solvent (C) were mixed, and then heated to 120° C. to prepare a mixed solution. Next, while stirring the above cold water, the mixed solution was gradually added to the cold water. Subsequently, 4 parts of polyoxyethylene castor oil (trade name "BLAUNON BR-410," manufactured by Aoki Oil Industrial Co., Ltd) having an HLB of 6.4 as the surfactant (E) was provided as a 50% solution of 4 parts of ethylene glycol monobutyl ether as the first solvent (C), and the 50% solution was gradually added to the cold water to which the mixed solution had been added. After all the mixed solution was added, the obtained dispersion was transferred to a container and subjected to a heating treatment in a thermostatic bath at 80° C. for 24 hours to thereby obtain a rheology control agent of Preparation Example S52 shown in Table 5.

Preparation Examples S53 to S70

Rheology control agents of Preparation Examples S53 to S70 were obtained in the same manner as in Preparation Example S52 except that components described in Table 5 were used as components of the rheology control agent, and these components were added at the formulation ratios described in Table 5 and subjected to a heating treatment at the heating treatment temperatures described in Table 5.

TABLE 3

| | Formulation of rheology control agent (Preparation examples Part 1) | | | | | | | | | | | | |
| Component | Formulation/Type | S1 | S2 | S3 | S4 | S5 | S6 | S7 | S8 | S9 | S10 | S11 | S12 |
|---|---|---|---|---|---|---|---|---|---|---|---|---|---|
| Diamide | A-1 | 5.0 | — | — | — | 2.5 | 3.0 | 3.0 | 3.0 | 7.0 | 7.0 | 7.0 | 7.0 |
| compound (A) | A-2 | — | 5.0 | — | — | — | — | — | — | — | — | — | — |
| | A-3 | — | — | 5.0 | — | — | — | — | — | — | — | — | — |
| | A-4 | — | — | — | — | — | 2.0 | — | — | — | — | — | — |
| | A-5 | — | — | — | — | — | — | 2.0 | — | — | — | — | — |
| | A-6 | — | — | — | — | — | — | — | 2.0 | — | — | — | — |
| Hydrogenated castor oil (A') | | — | — | — | 5.0 | 2.5 | — | — | — | — | — | — | — |
| Polyamide | B-1 | — | — | — | — | — | — | — | — | 3.0 | — | — | — |
| compound (B) | B-2 | — | — | — | — | — | — | — | — | — | 3.0 | — | — |
| | B-3 | — | — | — | — | — | — | — | — | — | — | 3.0 | — |
| | B-4 | — | — | — | — | — | — | — | — | — | — | — | 3.0 |
| | B-5 | — | — | — | — | — | — | — | — | — | — | — | — |
| | B-6 | — | — | — | — | — | — | — | — | — | — | — | — |
| | B-7 | — | — | — | — | — | — | — | — | — | — | — | — |
| | B-8 | — | — | — | — | — | — | — | — | — | — | — | — |
| | B-9 | — | — | — | — | — | — | — | — | — | — | — | — |
| Solvent (C) | BCS | 40.0 | 40.0 | 40.0 | 40.0 | 40.0 | 40.0 | 40.0 | 40.0 | 37.4 | 37.5 | 37.6 | 37.4 |
| Water (D) | Water | 48.0 | 48.0 | 48.0 | 48.0 | 48.0 | 48.0 | 48.0 | 48.0 | 50.0 | 50.0 | 50.0 | 50.0 |
| Surfactant (E) | HCO-EO:10 | 2.0 | 2.0 | 2.0 | 2.0 | 2.0 | 2.0 | 2.0 | 2.0 | 2.0 | 2.0 | 2.0 | 2.0 |
| Solvent (F) | EG | 5.0 | 5.0 | 5.0 | 5.0 | 5.0 | 5.0 | 5.0 | 5.0 | — | — | — | — |
| Neutralizing base (G) | DMEA | — | — | — | — | — | — | — | — | 0.6 | 0.5 | 0.4 | 0.6 |
| | TEA | — | — | — | — | — | — | — | — | — | — | — | — |
| Total | | 100.0 | 100.0 | 100.0 | 100.0 | 100.0 | 100.0 | 100.0 | 100.0 | 100.0 | 100.0 | 100.0 | 100.0 |
| Heating treatment temperature [° C.] | | 80 | 80 | 85 | 60 | 80 | 80 | 80 | 80 | 80 | 80 | 80 | 80 |

| Component | Formulation/Type | S13 | S14 | S15 | S16 | S17 | S18 | S19 | S20 | S21 | S22 | S23 |
|---|---|---|---|---|---|---|---|---|---|---|---|---|
| Diamide | A-1 | 7.0 | 7.0 | 7.0 | 7.0 | 7.0 | 7.0 | 6.0 | 3.0 | 5.0 | 20.0 | 30.0 |
| compound (A) | A-2 | — | — | — | — | — | — | — | — | — | — | — |
| | A-3 | — | — | — | — | — | — | — | — | — | — | — |
| | A-4 | — | — | — | — | — | — | — | — | — | — | — |
| | A-5 | — | — | — | — | — | — | — | — | — | — | — |
| | A-6 | — | — | — | — | — | — | — | — | — | — | — |

TABLE 3-continued

| Formulation of rheology control agent (Preparation examples Part 1) | | | | | | | | | | | | |
|---|---|---|---|---|---|---|---|---|---|---|---|---|
| Hydrogenated castor oil (A') | | — | — | — | — | — | — | — | — | — | — | — |
| Polyamide | B-1 | — | — | — | — | — | 3.0 | 4.0 | — | — | — | — |
| compound (B) | B-2 | — | — | — | — | — | — | — | — | — | — | — |
| | B-3 | — | — | — | — | — | — | — | — | — | — | — |
| | B-4 | — | — | — | — | — | — | — | — | — | — | — |
| | B-5 | 3.0 | — | — | — | — | — | — | — | — | — | — |
| | B-6 | — | 3.0 | — | — | — | — | — | — | — | — | — |
| | B-7 | — | — | 3.0 | — | — | — | — | — | — | — | — |
| | B-8 | — | — | — | 3.0 | — | — | — | — | — | — | — |
| | B-9 | — | — | — | — | 3.0 | — | — | — | — | — | — |
| Solvent (C) | BCS | 37.7 | 37.0 | 37.6 | 37.6 | 37.4 | 37.4 | 37.2 | 75.8 | 73.0 | 52.0 | 38.0 |
| Water (D) | Water | 50.0 | 50.0 | 50.0 | 50.0 | 50.0 | 50.0 | 50.0 | 20.0 | 20.0 | 20.0 | 20.0 |
| Surfactant (E) | HCO-EO:10 | 2.0 | 2.0 | 2.0 | 2.0 | 2.0 | 2.0 | 2.0 | 1.2 | 2.0 | 8.0 | 12.0 |
| Solvent (F) | EG | — | — | — | — | — | — | — | — | — | — | — |
| Neutralizing base (G) | DMEA | 0.3 | 1.0 | 0.4 | 0.4 | 0.6 | — | 0.8 | — | — | — | — |
| | TEA | — | — | — | — | — | 0.6 | — | — | — | — | — |
| | Total | 100 | 100 | 100.0 | 100.0 | 100.0 | 100.0 | 100.0 | 100.0 | 100.0 | 100.0 | 100.0 |
| Heating treatment temperature [° C.] | | 80 | 80 | 80 | 80 | 80 | 80 | 80 | 75 | 75 | 75 | 75 |

TABLE 4

| Formulation of rheology control agent (Preparation examples Part 2) | | | | | | | | | | | | | | |
|---|---|---|---|---|---|---|---|---|---|---|---|---|---|---|
| Component | Formulation/ Type | S24 | S25 | S26 | S27 | S28 | S29 | S30 | S31 | S32 | S33 | S34 | S35 | S36 | S37 |
| Diamide compound (A) | A-1 | 5.0 | 5.0 | 5.0 | 5.0 | 5.0 | 5.0 | 5.0 | 5.0 | 5.0 | 5.0 | 5.0 | 5.0 | 5.0 | 5.0 |
| Polyamide compound (B) | B-1 | — | — | — | — | — | — | — | — | — | — | — | — | — | — |
| Solvent (C) | EHA | 95.0 | — | — | — | — | — | — | — | — | — | — | — | — | — |
| | EHG | — | 95.0 | — | — | — | — | — | — | — | — | — | — | — | — |
| | Texanol | — | — | 95.0 | — | — | — | — | — | — | — | — | — | — | — |
| | PhG | — | — | — | 95.0 | — | — | — | — | — | — | — | — | — | — |
| | BFDG | — | — | — | — | 95.0 | — | — | — | — | — | — | — | — | — |
| | BFG | — | — | — | — | — | 95.0 | — | — | — | — | — | — | — | — |
| | n-BuOH | — | — | — | — | — | — | 95.0 | — | — | — | — | — | — | — |
| | BCS | — | — | — | — | — | — | — | 95.0 | — | — | — | — | — | — |
| | BDG | — | — | — | — | — | — | — | — | 95.0 | — | — | — | — | — |
| | BTG | — | — | — | — | — | — | — | — | — | 95.0 | — | — | — | — |
| | MFDG | — | — | — | — | — | — | — | — | — | — | 95.0 | — | — | — |
| | MFG | — | — | — | — | — | — | — | — | — | — | — | 95.0 | — | — |
| | PMA | — | — | — | — | — | — | — | — | — | — | — | — | 95.0 | — |
| | MTG | — | — | — | — | — | — | — | — | — | — | — | — | — | 95.0 |
| | Cyclic amide | — | — | — | — | — | — | — | — | — | — | — | — | — | — |
| | Acyclic amide | — | — | — | — | — | — | — | — | — | — | — | — | — | — |
| Water (D) | Water | — | — | — | — | — | — | — | — | — | — | — | — | — | — |
| Surfactant (E) | HCO-EO:10 | — | — | — | — | — | — | — | — | — | — | — | — | — | — |
| Solvent (F) | EG | — | — | — | — | — | — | — | — | — | — | — | — | — | — |
| Neutralizing base (G) | DMEA | — | — | — | — | — | — | — | — | — | — | — | — | — | — |
| | Total | 100.0 | 100.0 | 100.0 | 100.0 | 100.0 | 100.0 | 100.0 | 100.0 | 100.0 | 100.0 | 100.0 | 100.0 | 100.0 | 100.0 |
| Heating treatment temperature [° C.] | | 85 | 85 | 85 | 75 | 80 | 80 | 75 | 80 | 80 | 80 | 85 | 85 | 80 | 85 |

| Component | Formulation/ Type | S38 | S39 | S40 | S41 | S42 | S43 | S44 | S45 | S46 | S47 | S48 | S49 | S50 | S51 |
|---|---|---|---|---|---|---|---|---|---|---|---|---|---|---|---|
| Diamide compound (A) | A-1 | 5.0 | 5.0 | 5.0 | 5.0 | 5.0 | 5.0 | 5.0 | 5.0 | 5.0 | 5.0 | 7.0 | 7.0 | 7.0 | 7.0 |
| Polyamide compound (B) | B-1 | — | — | — | — | — | — | — | — | — | — | 3.0 | 3.0 | 3.0 | 3.0 |
| Solvent (C) | EHA | — | — | — | — | — | — | — | — | — | — | — | — | — | — |
| | EHG | — | — | — | — | — | — | — | — | — | — | — | — | — | — |
| | Texanol | — | — | — | — | — | — | — | — | — | — | — | — | — | — |
| | PhG | — | — | — | — | — | — | — | — | — | — | — | — | — | — |
| | BFDG | — | — | 45.0 | — | — | — | — | — | — | — | — | — | — | — |
| | BFG | — | — | — | 45.0 | — | — | — | — | — | — | — | — | — | — |
| | n-BuOH | — | — | — | — | 45.0 | — | — | — | — | — | — | — | — | — |
| | BCS | — | — | — | — | — | 45.0 | — | 85.0 | 65.0 | 35.0 | 27.4 | 17.4 | 12.4 | 7.4 |
| | BDG | — | — | — | — | — | — | 45.0 | — | — | — | — | — | — | — |
| | BTG | — | — | — | — | — | — | — | — | — | — | — | — | — | — |
| | MFDG | — | — | — | — | — | — | — | — | — | — | — | — | — | — |
| | MFG | — | — | — | — | — | — | — | — | — | — | — | — | — | — |
| | PMA | — | — | — | — | — | — | — | — | — | — | — | — | — | — |

TABLE 4-continued

Formulation of rheology control agent (Preparation examples Part 2)

| | | | | | | | | | | | | | | | |
|---|---|---|---|---|---|---|---|---|---|---|---|---|---|---|---|
| | MTG | — | — | — | — | — | — | — | — | — | — | — | — | — | — |
| | Cyclic amide | 95.0 | — | — | — | — | — | — | — | — | — | — | — | — | — |
| | Acyclic amide | — | 95.0 | — | — | — | — | — | — | — | — | — | — | — | — |
| Water (D) | Water | — | — | 50.0 | 50.0 | 50.0 | 50.0 | 50.0 | 10.0 | 30.0 | 60.0 | 60.0 | 70.0 | 75.0 | 80.0 |
| Surfactant (E) | HCO-EO:10 | — | — | — | — | — | — | — | — | — | — | 2.0 | 2.0 | 2.0 | 2.0 |
| Solvent (F) | EG | — | — | — | — | — | — | — | — | — | — | — | — | — | — |
| Neutralizing base (G) | DMEA | — | — | — | — | — | — | — | — | — | — | 0.6 | 0.6 | 0.6 | 0.6 |
| Total | | 100.0 | 100.0 | 100.0 | 100.0 | 100.0 | 100.0 | 100.0 | 100.0 | 100.0 | 100.0 | 100.0 | 100.0 | 100.0 | 100.0 |
| Heating treatment temperature [° C.] | | 85 | 80 | 80 | 80 | 80 | 80 | 80 | 80 | 80 | 80 | 80 | 80 | 80 | 80 |

TABLE 5

Formulation of rheology control agent (Preparation examples Part 3)

| Component | Formulation/Type | S52 | S53 | S54 | S55 | S56 | S57 | S58 | S59 | S60 | S61 |
|---|---|---|---|---|---|---|---|---|---|---|---|
| Diamide compound (A) | A-1 | 5.0 | 5.0 | 5.0 | 5.0 | 5.0 | 5.0 | 5.0 | 5.0 | 5.0 | 5.0 |
| Polyamide compound (B) | B-1 | — | — | — | — | — | — | — | — | — | — |
| Solvent (C) | BCS | 45.0 | 45.0 | 45.0 | 45.0 | 45.0 | 45.0 | 45.0 | 45.0 | 45.0 | 45.0 |
| Water (D) | Water | 48.0 | 48.0 | 48.0 | 48.0 | 48.0 | 48.0 | 48.0 | 48.0 | 48.0 | 48.0 |
| Surfactant (E) | HCO | — | — | — | — | — | — | — | — | — | — |
| | CO | 2.0 | — | — | — | — | — | — | — | — | — |
| | Linear C18 | — | 2.0 | — | — | — | — | — | — | — | 1.0 |
| | Branched 2-EH | — | — | 2.0 | — | — | — | — | — | — | — |
| | Aromatic | — | — | — | 2.0 | — | — | — | — | — | — |
| | HCO-Ester (mono) | — | — | — | — | 2.0 | — | — | — | — | — |
| | HCO-Ester (tri) | — | — | — | — | — | 2.0 | — | — | — | — |
| | Gly-Ester (mono) | — | — | — | — | — | — | 2.0 | — | — | 1.0 |
| | Sorbitan | — | — | — | — | — | — | — | 2.0 | — | — |
| | Propylene | — | — | — | — | — | — | — | — | 2.0 | — |
| | HCO-EO:3 | — | — | — | — | — | — | — | — | — | — |
| | HCO-EO:10 | — | — | — | — | — | — | — | — | — | — |
| | HCO-EO:25 | — | — | — | — | — | — | — | — | — | — |
| | HCO-EO:40 | — | — | — | — | — | — | — | — | — | — |
| | HCO-EO:100 | — | — | — | — | — | — | — | — | — | — |
| | HCO-EO:200 | — | — | — | — | — | — | — | — | — | — |
| Solvent (F) | EG | — | — | — | — | — | — | — | — | — | — |
| Neutralizing base (G) | DMEA | — | — | — | — | — | — | — | — | — | — |
| Total | | 100.0 | 100.0 | 100.0 | 100.0 | 100.0 | 100.0 | 100.0 | 100.0 | 100.0 | 100.0 |
| Heating treatment temperature [° C.] | | 80 | 80 | 80 | 80 | 80 | 80 | 80 | 80 | 80 | 80 |

| Component | Formulation/Type | S62 | S63 | S64 | S65 | S66 | S67 | S68 | S69 | S70 |
|---|---|---|---|---|---|---|---|---|---|---|
| Diamide compound (A) | A-1 | 5.0 | 5.0 | 5.0 | 5.0 | 5.0 | 5.0 | 5.0 | 5.0 | 5.0 |
| Polyamide compound (B) | B-1 | — | — | — | — | — | — | — | — | — |
| Solvent (C) | BCS | 45.0 | 45.0 | 45.0 | 45.0 | 45.0 | 45.0 | 45.0 | 45.0 | 45.0 |
| Water (D) | Water | 48.0 | 48.0 | 48.0 | 48.0 | 48.0 | 49.0 | 45.0 | 40.0 | 35.0 |
| Surfactant (E) | HCO | — | — | — | — | — | 1.0 | 5.0 | 10.0 | 15.0 |
| | CO | — | — | — | — | — | — | — | — | — |
| | Linear C18 | — | — | — | — | — | — | — | — | — |
| | Branched 2-EH | — | — | — | — | — | — | — | — | — |
| | Aromatic | — | — | — | — | — | — | — | — | — |
| | HCO-Ester (mono) | — | — | — | — | — | — | — | — | — |
| | HCO-Ester (tri) | — | — | — | — | — | — | — | — | — |
| | Gly-Ester (mono) | — | — | — | — | — | — | — | — | — |
| | Sorbitan | — | — | — | — | — | — | — | — | — |
| | Propylene | — | — | — | — | — | — | — | — | — |
| | HCO-EO:3 | 2.0 | — | — | — | — | — | — | — | — |
| | HCO-EO:10 | — | — | — | — | — | — | — | — | — |
| | HCO-EO:25 | — | 2.0 | — | — | — | — | — | — | — |
| | HCO-EO:40 | — | — | 2.0 | — | — | — | — | — | — |
| | HCO-EO:100 | — | — | — | 2.0 | — | — | — | — | — |
| | HCO-EO:200 | — | — | — | — | 2.0 | — | — | — | — |
| Solvent (F) | EG | — | — | — | — | — | — | — | — | — |
| Neutralizing base (G) | DMEA | — | — | — | — | — | — | — | — | — |
| Total | | 100.0 | 100.0 | 100.0 | 100.0 | 100.0 | 100.0 | 100.0 | 100.0 | 100.0 |
| Heating treatment temperature [° C.] | | 80 | 80 | 80 | 80 | 80 | 80 | 80 | 80 | 80 |

TABLE 6

| Component | Formulation/ Type | S71 | S72 | S73 | S74 | S75 | S76 | S77 | S78 | S79 | S80 | S81 | S82 | S83 |
|---|---|---|---|---|---|---|---|---|---|---|---|---|---|---|
| Diamide compound (A) | A-1 | 5.0 | 5.0 | 5.0 | 5.0 | 5.0 | 5.0 | 5.0 | 5.0 | 5.0 | 5.0 | 5.0 | 5.0 | 5.0 |
| Polyamide compound (B) | B-1 | — | — | — | — | — | — | — | — | — | — | — | — | — |
| Solvent (C) | BCS | 40.0 | 40.0 | 40.0 | 40.0 | 40.0 | 40.0 | 40.0 | 40.0 | 40.0 | 40.0 | 43.0 | 35.0 | 27.0 |
| Water (D) | Water | 48.0 | 48.0 | 48.0 | 48.0 | 48.0 | 48.0 | 48.0 | 48.0 | 48.0 | 48.0 | 48.0 | 48.0 | 48.0 |
| Surfactant (E) | CW-10 | 2.0 | 2.0 | 2.0 | 2.0 | 2.0 | 2.0 | 2.0 | 2.0 | 2.0 | 2.0 | 2.0 | 2.0 | 2.0 |
| Solvent (F) | EtOH | 5.0 | — | — | — | — | — | — | — | — | — | — | — | — |
| | EG | — | — | — | — | — | — | — | — | — | — | 2.0 | 10.0 | 18.0 |
| | PG | — | 5.0 | — | — | — | — | — | — | — | — | — | — | — |
| | 1,3-BG | — | — | 5.0 | — | — | — | — | — | — | — | — | — | — |
| | DEG | — | — | — | 5.0 | — | — | — | — | — | — | — | — | — |
| | Glycerin | — | — | — | — | 5.0 | — | — | — | — | — | — | — | — |
| | MFG | — | — | — | — | — | 5.0 | — | — | — | — | — | — | — |
| | ECS | — | — | — | — | — | — | 5.0 | — | — | — | — | — | — |
| | BDG | — | — | — | — | — | — | — | 5.0 | — | — | — | — | — |
| | MFDG | — | — | — | — | — | — | — | — | 5.0 | — | — | — | — |
| | EDG | — | — | — | — | — | — | — | — | — | 5.0 | — | — | — |
| Neutralizing base (G) | DMEA | — | — | — | — | — | — | — | — | — | — | — | — | — |
| Total | | 100.0 | 100.0 | 100.0 | 100.0 | 100.0 | 100.0 | 100.0 | 100.0 | 100.0 | 100.0 | 100.0 | 100.0 | 100.0 |
| Heating treatment temperature [° C.] | | 80 | 80 | 80 | 80 | 80 | 80 | 80 | 80 | 80 | 80 | 80 | 80 | 80 |

Comparative Preparation Example H1

As the rheology control agent of Comparative Preparation Example H1 shown in Table 7, a commercially available urethane thickener (trade name "ACRYSOL™ RM-2020," manufactured by Dow Chemical Co.) was used.

Comparative Preparation Example H2

156.6 parts of deionized water as the water (D) was weighed into a 500-mL four-necked flask equipped with a stirrer, a cooling tube and a thermometer, and heated to 40° C. to prepare warm water. Meanwhile, 21.0 parts of polyamide of Synthesis Example B-3 as the polyamide compound (B), 2.0 parts of diamide of Synthesis Example A-1 as the diamide compound (A), 7.0 parts of hydrogenated castor oil and 10.6 parts of propylene glycol monomethyl ether as the first solvent (C) were mixed, and then heated to 120° C. to prepare a mixed solution. Then, 2.8 parts of N,N'-dimethylethanolamine as the neutralizing base (G) was added to the mixed solution and mixed therewith. Next, while stirring the above warm water, the mixed solution was gradually added to the warm water. After all the mixed solution was added, stirring was continued for 10 minutes in a temperature range of 40 to 50° C. in order to complete dispersion to thereby obtain a dispersion. After completion of the stirring, the obtained dispersion was transferred to a container and subjected to a heating treatment in a thermostatic bath at 75° C. for 20 hours to thereby obtain a rheology control agent of Comparative Preparation Example H2 shown in Table 7.

Comparative Preparation Examples H3 and H4

Rheology control agents of Comparative Preparation Examples H3 and H4 were obtained in the same manner as in Comparative Preparation Example H2 except that components described in Table 7 were used as components of the rheology control agent, and these components were added at the formulation ratios described in Table 7 and subjected to a heating treatment at the heating treatment temperatures described in Table 7.

Comparative Preparation Example H5

The diamide of Synthesis Example A-1 was pulverized with a pulverizer into fine particles to thereby obtain a pulverized diamide compound having an average particle size of 10 μm. 126.0 parts of butyl acetate (BAC), 54 parts of alcoholic mixed solvent mainly composed of an industrial alcohol, and 20 parts of the pulverized diamide of Synthesis Example A-1 were introduced into a sealed container for heating treatment, and sufficiently dispersed at a temperature of 20 to 25° C. to thereby obtain a suspension. The sealed container containing the suspension was allowed to stand for 48 hours in a thermostatic bath set at 65° C. in advance, and then allowed to stand at room temperature for cooling to thereby obtain a rheology control agent of Comparative Preparation Example H5 shown in Table 7.

Comparative Preparation Example H6

96 parts of deionized water as the water (D) and 10 parts of ethylene glycol as the second solvent (F) were weighed into a 500-mL four-necked flask equipped with a stirrer, a cooling tube and a thermometer, and cooled to 10° C. to prepare the cold water. Meanwhile, 10 parts of diamide of Synthesis Example A-4 as the diamide compound (A) and 76 parts of ethylene glycol monobutyl ether as the first solvent (C) were mixed, and then heated to 120° C. to prepare a mixed solution. Next, while stirring the above cold water, the mixed solution was gradually added to the cold water. Subsequently, 4 parts of polyoxyethylene hydrogenated castor oil (trade name "BLAUNON CW-10," manufactured by Aoki Oil Industrial Co., Ltd) having an HLB of 6.4 as the surfactant (E) was provided as a 50% solution of 4 parts of ethylene glycol monobutyl ether, and the 50% solution was gradually added to the cold water to which the mixed solution had been added. After all the mixed solution was added, the obtained dispersion was transferred to a container and subjected to a heating treatment in a thermostatic bath at 80° C. for 24 hours to thereby obtain a rheology control agent of Comparative Preparation Example H6 shown in Table 7.

Comparative Preparation Examples H7 and H8

Rheology control agents of Comparative Preparation Examples H7 and H8 were obtained in the same manner as in Comparative Preparation Example H6 except that components described in Table 7 were used as components of the rheology control agent, and these components were added at the formulation ratios described in Table 7 and subjected to a heating treatment at the heating treatment temperatures described in Table 7.

Comparative Preparation Example H9

100 parts of deionized water as the water (D) was weighed into a 500-mL four-necked flask equipped with a stirrer, a cooling tube and a thermometer, and cooled to 10° C. to prepare the cold water. Meanwhile, 10 parts of diamide of Synthesis Example A-1 as the diamide compound (A), 10 parts of polyamide of Synthesis Example B-1 as the polyamide compound (B), 4 parts of polyoxyethylene hydrogenated castor oil (trade name "BLAUNON CW-10," manufactured by Aoki Oil Industrial Co., Ltd) having an HLB of (G) was added to the mixed solution and mixed therewith. Next, while stirring the above cold water, the mixed solution was gradually added to the cold water. After all the mixed solution was added, the obtained dispersion was transferred to a container and subjected to a heating treatment in a thermostatic bath at 80° C. for 24 hours to thereby obtain a rheology control agent of Comparative Preparation Example H9 shown in Table 7.

Comparative Preparation Examples H10 and H11

Rheology control agents of Comparative Preparation Examples H10 and H11 were obtained in the same manner as in Comparative Preparation Example H9 except that components described in Table 7 were used as components of the rheology control agent, and these components were added at the formulation ratios described in Table 7 and subjected to a heating treatment at the heating treatment temperatures described in Table 7.

TABLE 7

| | Formulation/ | | | | | | | | | | | | |
|---|---|---|---|---|---|---|---|---|---|---|---|---|---|
| Component | Type | Blank | H1 | H2 | H3 | H4 | H5 | H6 | H7 | H8 | H9 | H10 | H11 |
| Compound having urethane bond | | — | 20.0 | — | — | — | — | — | — | — | — | — | — |
| Diamide | A-1 | — | — | 1.0 | 2.0 | — | 10.0 | — | — | — | 5.0 | 7.0 | 7.0 |
| compound (A) | A-4 | — | — | — | — | 2.0 | — | 5.0 | — | — | — | — | — |
| | A-5 | — | — | — | — | — | — | — | 5.0 | — | — | — | — |
| | A-6 | — | — | — | — | — | — | — | — | 5.0 | — | — | — |
| Hydrogenated castor oil (A') | | — | — | 3.5 | — | — | — | — | — | — | — | — | — |
| Polyamide | B-1 | — | — | — | — | — | — | — | — | — | 5.0 | 3.0 | — |
| compound (B) | B-3 | — | — | 10.5 | — | 8.0 | — | — | — | — | — | — | — |
| | B-4 | — | — | — | 8.0 | — | — | — | — | — | — | — | — |
| | B-10 | — | — | — | — | — | — | — | — | — | — | — | 3.0 |
| Solvent (C) | BCS | — | — | — | — | — | — | 40.0 | 40.0 | 40.0 | 37.0 | — | 37.8 |
| | MFG | — | — | 5.3 | 6.0 | 6.0 | — | — | — | — | — | — | — |
| | BAC | — | — | — | — | — | 63.0 | — | — | — | — | — | — |
| Water (D) | Water | — | 80.0 | 78.3 | 80.75 | 80.8 | — | 48.0 | 48.0 | 48.0 | 50.0 | 87.4 | 50.0 |
| Surfactant (E) | 2-EH-EO:4 | — | — | — | 2.0 | 2.0 | — | — | — | — | — | — | — |
| | HCO-EO:10 | — | — | — | — | — | — | 2.0 | 2.0 | 2.0 | 2.0 | 2.0 | 2.0 |
| Solvent (F) | EG | — | — | — | — | — | — | 5.0 | 5.0 | 5.0 | — | — | — |
| | Alcoholic mixed solvent* | — | — | — | — | — | 27.0 | — | — | — | — | — | — |
| Neutralizing base (G) | Triethylamine | — | — | 1.4 | — | — | — | — | — | — | — | — | — |
| | DMEA | — | — | — | 1.25 | 1.2 | — | — | — | — | 1.0 | 0.6 | 0.2 |
| Total | | — | 100.0 | 100.0 | 100.0 | 100.0 | 100.0 | 100.0 | 100.0 | 100.0 | 100.0 | 100.0 | 100.0 |
| Heating treatment temperature [° C.] | | — | — | 75 | 80 | 80 | 65 | 80 | 80 | 80 | 80 | 80 | 80 |

6.4 as the surfactant (E) and 74 parts of ethylene glycol monobutyl ether as the first solvent (C) were mixed, and then heated to 120° C. to prepare a mixed solution. Then, 2.0 parts of N,N'-dimethylethanolamine as the neutralizing base The details of the first solvent (C), the surfactant (E), the second solvent (F) and the neutralizing base (G) used in the above preparation examples and comparative preparation examples were shown in Tables 8 to 11 below.

TABLE 8

| First solvent (C) | | | |
|---|---|---|---|
| Abbreviation | Formulation | Classification | HLB* |
| EHA | 2-ethylhexanol | Alcohol | 5.1 |
| EHG | 2-ethylhexyl glycol | Glycol | 5.4 |
| Texanol | 2,2,4-trimethyl pentanediol monoisobutyrate | Ester | 6.1 |
| PhG | Phenyl glycol | Glycol | 6.4 |
| BFDG | Dipropylene glycol monobutyl ether | Diglycol | 6.7 |
| BFG | Propylene glycol monobutyl ether | Glycol | 6.9 |
| n-BuOH | Normal butanol | Alcohol | 7.0 |

TABLE 8-continued

| | First solvent (C) | | |
|---|---|---|---|
| Abbreviation | Formulation | Classification | HLB* |
| BCS | Ethylene glycol monobutyl ether | Glycol | 7.3 |
| BDG | Diethylene glycol monobutyl ether | Diglycol | 7.6 |
| BTG | Triethylene glycol monobutyl ether | Triglycol | 7.9 |
| MFDG | Dipropylene glycol monomethyl ether | Diglycol | 8.1 |
| MFG | Propylene glycol monomethyl ether | Glycol | 8.3 |
| PMA | Propylene glycol monomethyl ether acetate | Ester | 8.3 |
| EDG | Diethylene glycol monoethyl ether | Diglycol | 8.6 |
| MTG | Triethylene glycol monomethyl ether | Triglycol | 9.4 |
| Glycerin | Glycerin | Polyhydric alcohol | 11.3 |
| NMP | N-methylpyrrolidone | Cyclic amide | — |
| MPA | 3-methoxy-N,N-dimethylpropanamide | Acyclic amide | — |

*Calculated by Davis method

TABLE 9

| | Surfactant (E) | | | | |
|---|---|---|---|---|---|
| Abbreviation | Formulation | EO | HLB* | Trade name | Manufacturer |
| HCO or HCO-EO:10 | Polyoxyethylene hydrogenated castor oil | 10 | 6.4 | BLAUNON CW-10 | Aoki Oil Industrial |
| CO | Polyoxyethylene castor oil | 10 | 6.4 | BLAUNON BR-410 | Aoki Oil Industrial |
| Linear C18 | Polyoxyethylene stearyl ether | 3 | 6 | EMALEX 603 | Nihon Emulsion |
| Branched 2-EH | Polyoxyethylene 2-ethylhexyl ether | 2 | 5.4 | 2-ethylhexyl glycol | Nippon Nyukazai |
| Aromatic | Polyoxyethylene styrenated phenyl ether | 8 | 10.6 | NOIGEN EA-87 | DKS |
| HCO-Ester (mono) | Polyoxyethylene hydrogenated castor oil monoisostearate | 15 | 7 | EMALEX RWIS-115 | Nihon Emulsion |
| HCO-Ester (tri) | Polyoxyethylene hydrogenated castor oil triisostearate | 20 | 6 | EMALEX RWIS-320 | Nihon Emulsion |
| Gly-Ester (mono) | Polyoxyethylene glyceryl monoisostearate | 3 | 6 | EMALEX GWIS-103 | Nihon Emulsion |
| Sorbitan | Polyoxyethylene sorbitan monostearate | 6 | 9.6 | RHEODOL TW-S106V | Kao |
| Propylene | Polyoxyethylene oxypropylene copolymer | | 8 | NEWPOL PE-74 | Sanyo Chemical |
| HCO-EO:3 | Polyoxyethylene hydrogenated castor oil | 3 | 2.8 | BLAUNON CW-3 | Aoki Oil Industrial |
| HCO-EO:25 | Polyoxyethylene hydrogenated castor oil | 25 | 10.8 | BLAUNON CW-25 | Aoki Oil Industrial |
| HCO-EO:40 | Polyoxyethylene hydrogenated castor oil | 40 | 13.1 | BLAUNON CW-40 | Aoki Oil Industrial |
| HCO-EO:100 | Polyoxyethylene hydrogenated castor oil | 100 | 16.5 | BLAUNON CW-100 | Aoki Oil Industrial |
| HCO-EO:200 | Polyoxyethylene hydrogenated castor oil | 200 | 18.1 | BLAUNON CW-200 | Aoki Oil Industrial |

*Manufacturer's catalog value (Griffin method)

TABLE 10

| | Second solvent (F) | |
|---|---|---|
| Abbreviation | Formulation | Classification |
| EtOH | Ethanol | Alcohol |
| EG | Ethylene glycol | Polyhydric alcohol (dihydric) |
| PG | Propylene glycol | Polyhydric alcohol (dihydric) |
| 1,3-BG | 1,3-butanediol | Polyhydric alcohol (dihydric) |
| DEG | Diethylene glycol | Polyhydric alcohol (dihydric) |
| Glycerin | Glycerin | Polyhydric alcohol (trihydric) |
| MFG | Propylene glycol monomethyl ether | Glycol |
| ECS | Ethylene glycol monoethyl ether | Glycol |
| BDG | Diethylene glycol monobutyl ether | Diglycol |
| MFDG | Dipropylene glycol monomethyl ether | Diglycol |
| EDG | Diethylene glycol monoethyl ether | Diglycol |

TABLE 11

| | Neutralizing base (G) | |
|---|---|---|
| Abbreviation | Formulation | Classification |
| DMEA | N,N-dimethylethanolamine | Alkanolamine |
| TEA | Triethylamine | Alkylamine |

Preparation of Water-Based Paint Composition

The rheology control agents of Preparation Examples S1 to S83 obtained as described above were used to prepare water-based paint compositions of Examples 1 to 95 with the type of the rheology control agent and the evaluation formulation of the paint shown in Tables 12 to 16. Further, the rheology control agents of Comparative Preparation Examples H1 to H11 obtained as described above were used to prepare water-based paint compositions of Comparative Examples 1 to 21 with the type of the rheology control agent and the evaluation formulation of the paint shown in Table 17. Furthermore, the rheology control agents of Comparative Preparation Examples H2 to H4 obtained as described above were used to prepare water-based paint compositions of Reference Examples 1 to 3. In Test Examples 1 to 4 described later, water-based paint compositions (blank 1, blank 1b, blank 2 and blank 3) containing no rheology control agent were also prepared (see Tables 17 and 18).

TABLE 12

Formulation and evaluation results of water-based paint composition (Examples Part 1)

| | Example No. | 1 | 2 | 3 | 4 | 5 | 6 | 7 | 8 | 9 | 10 | 11 | 12 |
|---|---|---|---|---|---|---|---|---|---|---|---|---|---|
| | Rheology control agent | S1 | S2 | S3 | S4 | S5 | S6 | S7 | S8 | S9 | S10 | S11 | S12 |
| | Evaluation formulation | 2 | 2 | 2 | 2 | 2 | 2 | 2 | 2 | 2 | 2 | 2 | 2 |
| Evaluation result | Anti-settling [25° C.] | A | A | C | A | A | A | A | A | A | A | A | A |
| | Anti-settling [60° C.] | A | A | C | C | A | A | B | A | B | B | A | A |
| | Thermal stability | A | A | A | C | A | A | B | A | B | B | A | A |
| | Storage stability of the paint | — | — | — | — | — | — | — | — | — | — | — | — |
| | Anti-sagging | — | — | — | — | — | — | — | — | — | — | — | — |

| | Example No. | 13 | 14 | 15 | 16 | 17 | 18 | 19 | 20 | 21 | 22 | 23 |
|---|---|---|---|---|---|---|---|---|---|---|---|---|
| | Rheology control agent | S13 | S14 | S15 | S16 | S17 | S18 | S19 | S20 | S21 | S22 | S23 |
| | Evaluation formulation | 2 | 2 | 2 | 2 | 2 | 2 | 2 | 1 | 1 | 1 | 1 |
| Evaluation result | Anti-settling [25° C.] | A | C | A | A | A | A | A | A | A | A | A |
| | Anti-settling [60° C.] | A | C | A | B | A | A | B | A | A | A | A |
| | Thermal stability | A | A | A | B | A | A | B | A | A | A | A |
| | Storage stability of the paint | — | — | — | — | — | — | — | A | A | A | A |
| | Anti-sagging | — | — | — | — | — | — | — | B | A | B | C |

TABLE 13

Formulation and evaluation results of water-based paint composition (Examples Part 2)

| | Example No. | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|
| | Rheology control agent | S24 | S25 | S26 | S27 | S28 | S29 | S30 | S31 | S32 | S33 | S34 | S35 | S36 | S37 | S38 |
| | Evaluation formulation | 3 | 3 | 3 | 3 | 3 | 3 | 3 | 3 | 3 | 3 | 3 | 3 | 3 | 3 | 3 |
| Evaluation result | Anti-settling [25° C.] | A | A | A | A | B | A | A | A | A | A | A | A | A | B | C |
| | Anti-settling [60° C.] | B | B | A | B | B | B | C | A | A | B | B | C | C | B | C |
| | Thermal stability | B | | A | B | B | B | C | A | A | B | B | C | C | A | A |
| | Storage stability of the paint | — | — | — | — | — | — | — | — | — | — | — | — | — | — | — |
| | Anti-sagging | — | — | — | — | — | — | — | — | — | — | — | — | — | — | — |

| | Example No. | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|
| | Rheology control agent | S39 | S40 | S41 | S42 | S43 | S44 | S45 | S46 | S47 | SS | S48 | S49 | S50 | S51 |
| | Evaluation formulation | 3 | 3 | 3 | 3 | 3 | 3 | 3 | 3 | 3 | 3 | 3 | 3 | 3 | 3 |
| Evaluation result | Anti-settling [25° C.] | A | A | A | A | A | A | A | A | A | A | A | A | A | A |
| | Anti-settling [60° C.] | C | A | B | B | A | B | B | A | A | A | A | A | A | C |
| | Thermal stability | C | A | B | B | A | B | B | A | A | A | A | A | A | C |
| | Storage stability of the paint | — | — | — | — | — | — | — | — | — | — | — | — | — | — |
| | Anti-sagging | — | — | — | — | — | — | — | — | — | — | — | — | — | — |

TABLE 14

Formulation and evaluation results of water-based paint composition (Examples Part 3)

| | Example No. | 53 | 54 | 55 | 56 | 57 | 58 | 59 | 60 | 61 | 62 |
|---|---|---|---|---|---|---|---|---|---|---|---|
| | Rheology control agent | S52 | S53 | S54 | S55 | S56 | S57 | S58 | S59 | S60 | S61 |
| | Evaluation formulation | 1 | 1 | 1 | 1 | 1 | 1 | 1 | 1 | 1 | 1 |
| Evaluation result | Anti-settling [25° C.] | A | A | A | A | A | A | A | A | A | A |
| | Anti-settling [60° C.] | A | A | A | A | A | A | A | A | A | A |

TABLE 14-continued

| Formulation and evaluation results of water-based paint composition (Examples Part 3) | | | | | | | | | | |
|---|---|---|---|---|---|---|---|---|---|---|
| Thermal stability | A | A | A | A | A | A | A | A | A | A |
| Storage stability of the paint | A | A | B | A | A | A | A | A | A | A |
| Anti-sagging | B | B | B | C | A | A | A | A | A | B |

| | Example No. | 63 | 64 | 65 | 66 | 67 | 68 | 69 | 70 | 71 | 72 |
|---|---|---|---|---|---|---|---|---|---|---|---|
| | Rheology control agent | S62 | S63 | S64 | S65 | S66 | S43 | S67 | S68 | S69 | S70 |
| | Evaluation formulation | 1 | 1 | 1 | 1 | 1 | 1 | 1 | 1 | 1 | 1 |
| Evaluation result | Anti-settling [25° C.] | A | A | A | A | A | A | A | A | A | A |
| | Anti-settling [60° C.] | A | A | A | A | A | A | A | A | A | A |
| | Thermal stability | A | A | A | A | A | A | A | A | A | A |
| | Storage stability of the paint | B | A | A | A | A | A | A | A | A | B |
| | Anti-sagging | C | A | A | A | B | B | B | A | A | C |

TABLE 15

| Formulation and evaluation results of water-based paint composition (Examples Part 4) | | | | | | | | | | | | | |
|---|---|---|---|---|---|---|---|---|---|---|---|---|---|
| Example No. | 73 | 74 | 75 | 76 | 77 | 78 | 79 | 80 | 81 | 82 | 83 | 84 | 85 |
| Rheology control agent | S71 | S72 | S73 | S74 | S75 | S76 | S77 | S78 | S79 | S80 | S81 | S82 | S83 |
| Evaluation formulation | 2 | 2 | 2 | 2 | 2 | 2 | 2 | 2 | 2 | 2 | 2 | 2 | 2 |
| Evaluation result — Anti-settling [25° C.] | A | B | A | A | A | A | A | A | A | A | A | B | B |
| Anti-settling [60° C.] | A | A | A | A | A | A | A | A | A | A | A | B | C |
| Thermal stability | A | A | A | A | A | A | A | A | A | A | A | A | B |
| Storage stability of the paint | — | — | — | — | — | — | — | — | — | — | — | — | — |
| Anti-sagging | — | — | — | — | — | — | — | — | — | — | — | — | — |

TABLE 16

| Formulation and evaluation results of water-based paint composition (Examples Part 5) | | | | | | | | | | |
|---|---|---|---|---|---|---|---|---|---|---|---|
| Example No. | 86 | 87 | 88 | 89 | 90 | 91 | 92 | 93 | 94 | 95 |
| Rheology control agent | S21 | S52 | S53 | S58 | S63 | S64 | S66 | S43 | S69 | S70 |
| Evaluation formulation | 1b | 1b | 1b | 1b | 1b | 1b | 1b | 1b | 1b | 1b |
| Evaluation result — Anti-settling [25° C.] | A | A | A | A | A | A | A | A | A | A |
| Anti-settling [60° C.] | A | A | A | A | A | A | A | A | A | A |
| Thermal stability | A | A | A | A | A | A | A | A | A | A |
| Storage stability of the paint | — | — | — | — | — | — | — | — | — | — |
| Anti-sagging | A | A | A | A | A | A | B | A | A | B |

TABLE 17

| Formulation and evaluation results of water-based paint composition (Comparative examples) | | | | | | | | | | | | |
|---|---|---|---|---|---|---|---|---|---|---|---|---|
| | blank 1 | blank 2 | blank 3 | 1 | 2 | 3 | 4 | 5 | 6 | 7 | 8 | 9 |
| Comparative example No. | | | | | | | | | | | | |
| Rheology control agent | — | — | — | H1 | H2 | H3 | H4 | H5 | H1 | H2 | H3 | H4 |
| Evaluation formulation | 1 | 2 | 3 | 1 | 1 | 1 | 1 | 1 | 2 | 2 | 2 | 2 |
| Evaluation result — Anti-settling [25° C.] | — | D | D | A | A | D | D | D | D | A | A | A |
| Anti-settling [60° C.] | — | D | D | A | D | D | D | D | D | D | D | D |
| Thermal stability | — | D | D | A | D | D | D | D | D | D | D | D |
| Storage stability of the paint | A | — | — | A | D | D | D | — | — | — | — | — |
| Anti-sagging | D | — | — | D | A | B | A | — | — | — | — | — |

TABLE 17-continued

| | | | | | | | | | | | | |
|---|---|---|---|---|---|---|---|---|---|---|---|---|
| Formulation and evaluation results of water-based paint composition (Comparative examples) | | | | | | | | | | | | |
| Comparative example No. | 10 | 11 | 12 | 13* | 14 | 15 | 16 | 17 | 18 | 19 | 20 | 21 |
| Rheology control agent | H5 | H6 | H7 | H8 | H9 | H11 | H1 | H2 | H3 | H4 | H5 | H10 |
| Evaluation formulation | 2 | 2 | 2 | 2 | 2 | 2 | 3 | 3 | 3 | 3 | 3 | 3 |
| Evaluation result   Anti-settling | D | D | — | D | D | D | A | D | D | A ** | D | D |
| [60° C.] | D | D | — | D | D | D | D | D | D | A ** | D | D |
| Thermal stability | D | D | — | D | D | D | D | — | — | A ** | D | D |
| Storage stability of the paint | — | — | — | — | — | — | — | — | — | — | — | — |
| Anti-sagging | — | — | — | — | — | — | — | — | — | — | — | — |

*Preparation failed

**Paint cloudy

TABLE 18

| | | | | |
|---|---|---|---|---|
| Formulation and evaluation results of water-based paint composition (Reference examples) | | | | |
| Reference example No. | blank 1b | 1 | 2 | 3 |
| Rheology control agent | — | H2 | H3 | H4 |
| Evaluation formulation | 1b | 1b | 1b | 1b |
| Evaluation result   Anti-settling [25° C] | B | A | A | A |
| Anti-settling [60° C] | B | B | B | B |
| Thermal stability | A | B | B | B |
| Storage stability of the paint | — | — | — | — |
| Anti-sagging | D | B | C | C |

[Method of Evaluating Water-Based Paint Composition]

For the water-based paint compositions of Examples 1 to 95, Comparative Examples 1 to 21 and Reference Examples 1 to 3 obtained as described above, various performance tests (Test Examples 1 to 4) were performed as below. The method of the performance tests will be described in detail below for each evaluation formulation of the paint (formulation composition of the paint used for evaluation) of the water-based paint compositions. In Test Examples 1 and 2, the "Part A" of the water-based two-component epoxy paint refers to a liquid agent containing a pigment and the "curing agent" refers to an agent containing no pigment of the two component of liquid agents before the Part A is cured.

Test Example 1: Evaluation of Water-Based Paint Composition Prepared with Evaluation Formulation 1

In Test Example 1, the performance test of the rheology control agent was performed using the water-based two-component epoxy paint formulation (Evaluation Formulation 1) shown in Table 19 as the evaluation formulation.

TABLE 19

| | | | |
|---|---|---|---|
| Evaluation Formulation 1 (water-based 2 component epoxy paint formulation) | | | |
| Raw material | Manufacturer | Function | Formulation amount (part) |
| Part A (epoxy) | | | |
| JR-600A | Tayca | Titanium white | 49.14 |
| K-WHITE 140W | Tayca | Anti-corrosive pigment | 34.02 |
| Barium sulfate | Sakai Chemical | Extender pigment | 100.17 |
| Talc #1 | Takehara Chemical | Extender pigment | 43.47 |
| deionized water | | Diluent | 98.28 |
| ADF-01 | Kusumoto Chemicals | Defoamer | 3.15 |
| jER W1155R55 | Mitsubishi Chemical | Solid epoxy resin | 206.64 |
| jER W3435R67 | Mitsubishi Chemical | Liquid epoxy resin | 57.33 |
| Ethylene glycol monobutyl ether | | Film-forming agent | 37.80 |
| Rheology control agent | | Rheology control agent | a |
| Paint formulation (Part A + Part B) | | | |
| Part A | | Epoxy resin | 100.00 |
| jER WD11M60 | Mitsubishi Chemical | Amine curing agent | 23.50 | a = 0.6 mass % (in terms of active ingredients)

Formulation ratio: epoxy/amine = 1/0.8

As shown in Table 19, 49.14 parts of JR-600A (manufactured by Tayca Corporation) as a color pigment (titanium white), 34.02 parts of K-WHITE 140W (manufactured by Tayca Corporation) as an anti-corrosive pigment, 100.17 parts of barium sulfate (manufactured by Sakai Chemical Industry Co., Ltd.) and 43.47 parts of Talc #1 (manufactured by Takehara Chemical Industrial Co., Ltd) as extender pigments, 98.28 parts of deionized water as a diluent, and 3.15 parts of ADF-01 (manufactured by Kusumoto Chemicals, Ltd.) as a defoamer were stirred and mixed with a lab dissolver. Then, 206.64 parts of jER W1155R55 (manufactured by Mitsubishi Chemical Corporation) and 57.33 parts of jER W3435R67 (manufactured by Mitsubishi Chemical Corporation) as epoxy resins and 37.80 parts of ethylene glycol monobutyl ether as a film-forming agent were added to the mixture to thereby prepare an epoxy resin. Then, 0.6 mass % of the rheology control agent (in terms of mass of the active matter (X) which is an active ingredient) of any one of Preparation Examples S20 to S23, S43, S52 to S70 and Comparative Preparation Examples H1 to H5 was added to the epoxy resin, and the mixture was dispersed for 10 minutes at a rotation speed of 2000 rpm with a lab dissolver (φ40) to thereby prepare water-based paint compositions (before mixing with the curing agent) of Examples 20 to 23, 53 to 72 and Comparative Examples 1 to 5.

<Evaluation of Anti-Settling Properties and Thermal Stability>

The water-based paint compositions (before mixing with the curing agent) prepared as described above were transferred to a 50-mL glass bottle, and allowed to stand in thermostatic baths at 25° C. and 60° C. for 7 days. Then, the degree of pigment caking in the paint (before mixing with the curing agent) was compared with the degree of caking of a blank (epoxy resin containing no rheology control agent) using a spatula, for evaluation of the anti-settling properties according to the following criteria.

Evaluation Criteria

A: The pigment is well dispersed (equivalent to the blank)
B: A clear layer is slightly separated (re-disperses when re-stirred, and returns to the state at the time of preparation)
C: Soft caking occurred (re-disperses when re-stirred, and returns to the state at the time of preparation)
D: Change in state or soft caking occurred (does not return to the state at the time of preparation even if it is re-stirred)
D: Pigment is unevenly present or separated Based on the difference between the evaluation of anti-settling properties when stored at 25° C. and the evaluation of anti-settling properties when stored at 60° C., the thermal stability was evaluated according to the following criteria.

Evaluation Criteria

A: Evaluations of anti-settling properties at 25° C. and 60° C. are the same
  (Both A grades, both B grades, or both C grades)
B: Evaluations of anti-settling properties at 25° C. and 60° C. are different by one grade
  (A grade and B grade, B grade and C grade, or C grade and D grade)
C: Evaluations of anti-settling properties at 25° C. and 60° C. are different by two grades
  (A grade and C grade, or B grade and D grade)

D: Evaluations of anti-settling properties at 25° C. and 60° C. are different by three grades
  (A grade and D grade)
D: Unevaluable
  (Evaluations of anti-settling properties at 25° C. and 60° C. are both D grade)

<Evaluation of Storage Stability of Paint>

On the day the water-based paint composition (before mixing with the curing agent) was prepared as described above, the viscosity (mPa s) at 60 rpm and viscosity (mPa s) at 6 rpm were measured at 25° C. using a Brookfield viscometer to calculate a T.I. value (viscosity at 6 rpm/viscosity at 60 rpm). Also, after the water-based paint composition (before mixing with the curing agent) was prepared, it was allowed to stand in a thermostatic bath at 25° C. for 4 weeks. On the day after preparation and every week after preparation, the viscosity (mPa s) at 60 rpm and viscosity (mPa s) at 6 rpm were measured at 25° C. using a Brookfield viscometer to calculate a T.I. value (viscosity at 6 rpm/viscosity at 60 rpm). Further, based on the value of viscosity change ratio calculated according to the following formula, the storage stability of the paint was evaluated according to the following criteria. In Comparative Example 5, the evaluation of storage stability was stopped on the day after preparation of the epoxy resin since dispersion defects in the paint were found by visual inspection and the paint was inhomogeneous.

Viscosity change ratio=(Viscosity at 60 rpm 4 weeks
  after preparation/Viscosity at 60 rpm on the day
  of preparation)×100

Evaluation Criteria

A: Viscosity change ratio is less than 168% (equivalent to the blank)
B: Viscosity change ratio is 168% or more and less than 190%
C: Viscosity change ratio is 190% or more and less than 220%
D: Viscosity change ratio is 220% or more <Evaluation of Anti-Sagging Properties>

As shown in Table 19, 100.00 parts of the water-based paint composition (before mixing with the curing agent) prepared as described above was mixed with 23.50 parts of jER WD11M60 (manufactured by Mitsubishi Chemical Corporation) as the amine curing agent to thereby prepare a water-based paint composition (water-based epoxy paint). After the Part A and the Part B were mixed, the mixture was diluted with deionized water so that the viscosity measured with a Brookfield viscometer becomes 20P (25° C.), and the anti-sagging properties were measured using a sag tester. Based on the measured values, the anti-sagging properties were evaluated according to the following criteria. In Comparative Example 5, the evaluation of anti-sagging properties was not performed since dispersion defects in the paint were found by visual inspection and the paint was inhomogeneous.

Evaluation Criteria

A: Measured value is 450 μm or more
B: Measured value is 400 μm or more and less than 450 μm
C: Measured value is greater than 300 and less than 400 μm
D: Measured value is 300 μm or less (equivalent to the blank)

Test Example 2: Evaluation of Water-Based Paint Composition Prepared with Evaluation Formulation 1b In Test Example 2, the performance test of the rheology control agent was performed using the water-based two-component epoxy paint formulation (Evaluation Formulation 1b) shown in Table 20 as the evaluation formulation.

TABLE 20

Evaluation Formulation 1b (water-based 2 component epoxy paint formulation)

| Raw material | Manufacturer | Function | Formulation amount (part) |
|---|---|---|---|
| Part A (amine) | | | |
| JR-600A | Tayca | Titanium white | 66.30 |
| K-WHITE 140W | Tayca | Anti-corrosive pigment | 45.90 |
| Barium sulfate | Sakai Chemical | Extender pigment | 135.15 |
| Talc #1 | Takehara Chemical | Extender pigment | 58.65 |
| deionized water | | Diluent | 132.60 |
| ADF-01 | Kusumoto Chemicals | Defoamer | 4.25 |
| jER WD11M60 | Mitsubishi Chemical | Amine | 199.75 |
| Rheology control agent | | Rheology control agent | a |
| Part B (epoxy) | | | |
| jER W1155R55 | Mitsubishi Chemical | Solid epoxy resin | 170.56 |
| jER W3435R67 | Mitsubishi Chemical | Liquid epoxy resin | 47.32 |
| Ethylene glycol monobutyl ether | | Film-forming agent | 31.20 |
| Paint formulation (Part A + Part B) | | | |
| Part A | | Amine resin | 75.60 |
| Part B | | Epoxy curing agent | 47.90 | a = 0.6 mass % (in terms of active ingredients)
Formulation ratio: epoxy/amine = 1/0.8

As shown in Table 20, 66.30 parts of JR-600A (manu-factured by Tayca Corporation) as a color pigment (titanium white), 45.90 parts of K-WHITE 140W (manufactured by Tayca Corporation) as an anti-corrosive pigment, 135.15 parts of barium sulfate (manufactured by Sakai Chemical Industry Co., Ltd.) and 58.65 parts of Talc #1 (manufactured by Takehara Chemical Industrial Co., Ltd) as extender pigments, 132.60 parts of deionized water as a diluent, and 4.25 parts of ADF-01 (manufactured by Kusumoto Chemi-cals, Ltd.) as a defoamer were stirred and mixed with a lab dissolver. Then, 199.75 parts of jER WD11M60 (manufac-tured by Mitsubishi Chemical Corporation) as amine was added to the mixture to thereby prepare an amine resin. Then, 0.6 mass % of the rheology control agent (in terms of mass of the active matter (X) which is an active ingredient) of any one of Preparation Examples S21, S43, S52, S53, S58, S63, S64, S66, S69, S70 and Comparative Preparation Examples H2 to H4 was added to the amine resin, and the mixture was dispersed for 10 minutes at a rotation speed of 2000 rpm with a lab dissolver ($\varphi$40) to thereby prepare water-based paint compositions (before mixing with the curing agent) of Examples 86 to 95 and Reference Examples 1 to 3.

Further, as shown in Table 20, 170.56 parts of jER W1155R55 (manufactured by Mitsubishi Chemical Corpo-ration) and 47.32 parts of jER W3435R67 (manufactured by Mitsubishi Chemical Corporation) as epoxy resins and 31.20 parts of ethylene glycol monobutyl ether as a film-forming agent were stirred and mixed with a lab dissolver to thereby prepare an epoxy curing agent.

<Evaluation of Anti-Settling Properties and Thermal Stabil-ity>

The water-based paint compositions (before mixing with the curing agent) prepared as described above were trans-ferred to a 50-ml glass bottle, and allowed to stand in thermostatic baths at 25° C. and 60° C. for 7 days. The volume percentage of the settled pigment (Iriodin) relative to the total volume of the paint (hereinafter, referred to as a "sedimentation ratio") was measured. Based on the mea-sured values, the anti-settling properties were evaluated according to the following criteria.

Evaluation Criteria

A: Sedimentation ratio is 80% or more
B: Sedimentation ratio is 50% or more and less than 80%
C: Sedimentation ratio is 25% or more and less than 50%
D: Sedimentation ratio is less than 25%

Based on the difference between the evaluation of anti-settling properties when stored at 25° C. and the evaluation of anti-settling properties when stored at 60° C., the thermal stability was evaluated according to the following criteria.

Evaluation Criteria

A: Evaluations of anti-settling properties at 25° C. and 60° C. are the same
(Both A grades, both B grades, or both C grades)
B: Evaluations of anti-settling properties at 25° C. and 60° C. are different by one grade
(A grade and B grade, B grade and C grade, or C grade and D grade)
C: Evaluations of anti-settling properties at 25° C. and 60° C. are different by two grades
(A grade and C grade, or B grade and D grade)
D: Evaluations of anti-settling properties at 25° C. and 60° C. are different by three grades
(A grade and D grade)
D: Unevaluable
(Evaluations of anti-settling properties at 25° C. and 60° C. are both D grade)

<Evaluation of Anti-Sagging Properties>

As shown in Table 20, 75.60 parts of the water-based paint composition (before mixing with the curing agent) prepared as described above was mixed with 47.90 parts of the epoxy curing agent prepared as described above to thereby prepare a water-based paint composition (water-based epoxy paint). After the Part A and the Part B were mixed, the mixture was diluted with deionized water so that the viscosity measured with a Brookfield viscometer becomes 20P (25° C.), and the anti-sagging properties were measured using a sag tester. Based on the measured values, the anti-sagging properties were evaluated according to the following criteria.

Evaluation Criteria

A: Measured value is 450 μm or more
B: Measured value is 400 μm or more and less than 450 μm
C: Measured value is greater than 300 and less than 400 μm
D: Measured value is 300 μm or less (equivalent to the blank)

Test Example 3: Evaluation of Water-Based Paint Composition Prepared with Evaluation Formulation 2

In Test Example 3, the performance test of the rheology control agent was performed using the acrylic emulsion paint formulation (Evaluation Formulation 2) shown in Table 21 as the evaluation formulation.

TABLE 21

| Evaluation Formulation 2 (acrylic emulsion paint formulation) | | | |
| --- | --- | --- | --- |
| Raw material | Manufacturer | Function | Formulation amount (part) |
| NeoCryl XK-12 | DSM | Acrylic resin | 586.58 |
| Dipropylene glycol monomethyl ether | | Film-forming agent | 27.38 |
| Dipropylene glycol monobutyl ether | | Film-forming agent | 23.48 |
| deionized water | | Diluent | 98.70 |
| N,N-dimethylethanolamine | | pH control agent | 1.50 |
| Iriodin 504 Red | Merck | Metallic pigment | 13.88 |
| Rheology control agent | | Rheology control agent | a | a = 0.6 mass % (in terms of active ingredients)

As shown in Table 21, 586.58 parts of NeoCryl XK-12 (manufactured by DSM) as an acryl resin, 27.38 parts of dipropylene glycol monomethyl ether and 23.48 parts of dipropylene glycol monobutyl ether as film-forming agents, and 98.70 parts of deionized water as a diluent were stirred and mixed. Then, the pH was adjusted to 8.3 using 1.50 parts of N,N'-dimethylethanolamine as a pH control agent to prepare a clear paint. 13.88 parts of Iriodin (registered trademark) 504 Red (manufactured by Merck & Co.) as a metallic pigment and 0.6 mass % of the rheology control agent (in terms of mass of the active matter (X) which is an active ingredient) of any one of Preparation Examples S1 to S19, S71 to 83 and Comparative Preparation Examples H1 to H9 and H11 were added to the clear paint, and the mixture was dispersed for 10 minutes at a rotation speed of 2000 rpm with a lab dissolver (φ40) to thereby prepare water-based paint compositions of Examples 1 to 19, 73 to 85 and Comparative Examples 6 to 15. The water-based paint composition in Comparative Example 13 was not subjected to the evaluation below since separation of the sample occurred.

<Evaluation of Anti-Settling Properties and Thermal Stability>

The water-based paint composition (acrylic emulsion paint) prepared as described above was diluted with deionized water so that the viscosity measured using a Ford cup #4 becomes 27 seconds (25° C.), and the diluted paint was transferred to a 50-mL glass bottle. Then, the diluted paint was allowed to stand in thermostatic baths at 25° C. and 60° C. for 7 days, and the volume percentage of the settled pigment (Iriodin) relative to the total volume of the paint (hereinafter, referred to as a "sedimentation ratio") was measured. Based on the measured values, the anti-settling properties were evaluated according to the following criteria.

Evaluation Criteria

A: Sedimentation ratio is 80% or more
B: Sedimentation ratio is 50% or more and less than 80%
C: Sedimentation ratio is 25% or more and less than 50%
D: Sedimentation ratio is less than 25%
D: Spinnability occurred in the paint
D: Paint gelled
Based on the difference between the evaluation of anti-settling properties when stored at 25° C. and the evaluation of anti-settling properties when stored at 60° C., the thermal stability was evaluated according to the following criteria.

Evaluation Criteria

A: Evaluations of anti-settling properties at 25° C. and 60° C. are the same
(Both A grades, both B grades, or both C grades)

B: Evaluations of anti-settling properties at 25° C. and 60° C. are different by one grade
(A grade and B grade, B grade and C grade, or C grade and D grade)
C: Evaluations of anti-settling properties at 25° C. and 60° C. are different by two grades
(A grade and C grade, or B grade and D grade)
D: Evaluations of anti-settling properties at 25° C. and 60° C. are different by three grades
(A grade and D grade)
D: Unevaluable
(Evaluations of anti-settling properties at 25° C. and 60° C. are both D grade)

Test Example 4: Evaluation of Water-Based Paint Composition Prepared with Evaluation Formulation 3

In Test Example 4, the performance test of the rheology control agent was performed using the acrylic melamine water-soluble paint formulation (Evaluation Formulation 3) shown in Table 22 as the evaluation formulation.

TABLE 22

Evaluation Formulation 3 (acrylic melamine water-soluble paint formulation)

| Raw material | Manufacturer | Function | Formulation amount (part) |
|---|---|---|---|
| WATERSOL S-727 | DIC | Acrylic resin | 250.16 |
| Cymel 303 | Allnex | Melamine resin | 35.87 |
| WATERSOL S-695 | DIC | Melamine resin | 23.79 |
| N,N-dimethylethanolamine | | pH control agent | 4.30 |
| deionized water | | Diluent | 583.31 |
| Iriodin 504 Red | Merck | Metallic pigment | 17.57 |
| Rheology control agent | | Rheology control agent | a | a = 0.4 mass % (in terms of active ingredients)

As shown in Table 22, 250.16 parts of WATERSOL S-727 (manufactured by DIC Corporation) as an acrylic resin, 35.87 parts of Cymel 303 (manufactured by Allnex) and 23.79 parts of WATERSOL S-695 (manufactured by DIC Corporation) as melamine resins, and 583.31 parts of deionized water as a diluent were stirred and mixed. Then, the pH was adjusted to 9.1 using 4.30 parts of N,N'-dimethylethanolamine as a pH control agent to prepare a clear paint. 17.57 parts of Iriodin (registered trademark) 504 Red (manufactured by Merck & Co.) as a metallic pigment and 0.4 mass % of the rheology control agent (in terms of mass of the active matter (X) which is an active ingredient) of any one of Preparation Examples S9, S24 to S51 and Comparative Preparation Examples H1 to H5 and H10 were added to the clear paint, and the mixture was dispersed for 10 minutes at a rotation speed of 2000 rpm with a lab dissolver (φ40) to thereby prepare water-based paint compositions of Examples 24 to 52 and Comparative Examples 16 to 21.

<Evaluation of Anti-Settling Properties and Thermal Stability>

The water-based paint composition (acrylic melamine water-soluble paint) prepared as described above was diluted with deionized water so that the viscosity measured with a Brookfield viscometer becomes 350 mPa s (25° C.), and the diluted paint was transferred to a 50-mL glass bottle. Then, the diluted paint was allowed to stand in thermostatic baths at 25° C. and 60° C. for 7 days, and the sedimentation ratio of the pigment (Iriodin) was measured. Based on the measured values, the anti-settling properties were evaluated according to the following criteria.

Evaluation Criteria

A: Sedimentation ratio is 80% or more
B: Sedimentation ratio is 50% or more and less than 80%
C: Sedimentation ratio is 25% or more and less than 50%
D: Sedimentation ratio is less than 25%
D: Spinnability occurred in the paint
Based on the difference between the evaluation of anti-settling properties when stored at 25° C. and the evaluation of anti-settling properties when stored at 60° C., the thermal stability was evaluated according to the following criteria.

Evaluation Criteria

A: Evaluations of anti-settling properties at 25° C. and 60° C. are the same
 (Both A grades, both B grades, or both C grades)
B: Evaluations of anti-settling properties at 25° C. and 60° C. are different by one grade
 (A grade and B grade, B grade and C grade, or C grade and D grade)

C: Evaluations of anti-settling properties at 25° C. and 60° C. are different by two grades
 (A grade and C grade, or B grade and D grade)
D: Evaluations of anti-settling properties at 25° C. and 60° C. are different by three grades
 (A grade and D grade)
D: Unevaluable (Evaluations of anti-settling properties at 25° C. and 60° C. are both D grade)

[Evaluation Results of Water-Based Paint Composition]

The above Tables 12 to 18 show the type of rheology control agent and the type of evaluation formulation used in the water-based paint compositions of Examples 1 to 95 and Comparative Examples 1 to 21, and the evaluation results (anti-settling properties, thermal stability, paint stability over time and anti-sagging properties) for each of the water-based paint compositions.

As shown in Tables 12 to 16, all the water-based paint compositions of Examples 1 to 95 had good (C grade or higher) anti-settling properties and thermal stability. Further, all the water-based paint compositions of Examples 20 to 23 and 53 to 72 had good (C grade or higher) paint stability over time and anti-sagging properties.

The comparison among Examples 1 to 8 showed the following findings on the type of the active matter (X). First, the anti-settling properties tend to be slightly lowered when the diamine component (A1) has a large number of carbon atoms (in particular, see Examples 1 and 3). Accordingly, from the perspective of enhancing the anti-settling properties, it is suggested that a diamine with 10 or fewer carbon atoms is preferably used as the diamine component (A1). Second, the thermal stability tends to be slightly inferior when the active matter (X) contains only the hydrogenated castor oil (A') (in particular, see Examples 1, 4 and 5). Accordingly, from the perspective of enhancing the thermal stability, it is suggested that at least the diamide compound (A) is contained in the active matter (X). Third, as long as a monocarboxylic acid (oxyacid) having at least a hydroxyl group is contained as the monocarboxylic acid component (A2), it is found that good (C grade or higher) anti-settling properties and thermal stability are exhibited even if an aromatic diamine or an alkanoic acid having no hydroxyl group is contained as a raw material of the diamide compound (A). However, even in this case, the thermal stability tends to be slightly inferior if an alkanoic acid has a large number of carbon atoms (C18 or more) (in particular, see Examples 7 and 8). Accordingly, from the perspective of enhancing the thermal stability, it is suggested that the number of carbon atoms is preferably 16 or less when an alkanoic acid is contained as a raw material of the diamide compound (A). Further, as seen from Comparative Examples 11 to 13, in the case where no monocarboxylic acid having a hydroxyl group is contained as the monocarboxylic acid component (A2), the anti-settling properties and thermal stability are found to be deteriorated.

From comparison among Examples 9 to 17 and Comparative Examples 15, the anti-settling properties and thermal stability are found to be excellent when the polyamide compound (B) has an acid value of 30 or more and 140 or less.

From comparison between Examples 9 and 18, the anti-settling properties and thermal stability are found to be excellent regardless of whether the neutralizing base (G) is an alkanolamine or alkylamine, when the rheology control agent contains the polyamide compound (B).

From comparison among Examples 9, 19 and Comparative Example 9, the anti-settling properties and thermal stability are found to be deteriorated when the total content of the diamide compound (A) and the hydrogenated castor oil (A') becomes less than 60 parts by mass relative to the total amount of the active matter (X) as 100 parts by mass.

From comparison among Examples 20 to 23, it is found that the content of the diamide compound (A) is preferably 3.0 mass % or more and 20.0 mass % or less, and more preferably 3.0 mass % or more and 15.0 mass % or less from the perspective of enhancing the anti-sagging properties.

From comparison among Examples 24 to 39 for the type of the solvent (C), it is found that good (C grade or higher) anti-settling properties and thermal stability are exhibited when the compound used as the solvent (C) has at least one substituent selected from the group consisting of a hydroxyl group, an ether group, an ester group, an amide group and a ketone group.

From comparison among Examples 28 to 32 and Examples 40 to 44, using a specific solvent (for example, BFDG, BFG, n-BuOH, BCS, BDG, or the like) as the solvent (C) is found to significantly reduce the content of the solvent (C) (to half or less), that is, equivalent anti-settling properties and thermal stability are found to be obtained with reduced amount of the solvent (C).

From comparison among Example 31, 43, and 45 to 52, it is found that good (C grade or higher) anti-settling properties and thermal stability are exhibited when the content of the first solvent (C) is 5 mass % or more and 99 mass % or less. From the perspective of improving the thermal stability, the content of the first solvent (C) is preferably 10 mass % or more and 99 mass % or less.

From comparison among Examples 53 to 67 for the type of the surfactant (E), it is found that good (C grade or higher) anti-settling properties and thermal stability are exhibited when a nonionic surfactant is used. From the perspective of enhancing the anti-sagging properties, a nonionic surfactant having an HLB value, as calculated by the Griffin method, of 3 or more and 18.5 or less is preferably used as the surfactant (E) (in particular, see Example 63). Also, from the perspective of enhancing the anti-sagging properties, a compound containing no aromatic ring is preferably used as the surfactant (E) (in particular, see Example 56).

From comparison among Examples 68 to 72, the content of the surfactant (E) is preferably 300 parts by mass or less when the diamide compound (A) and/or the hydrogenated castor oil (A') is 100 parts by mass. The comparison among these examples further shows that, from the perspective of enhancing the paint stability over time and anti-sagging properties, the content of the surfactant (E) is more preferably 200 parts by mass or less when the diamide compound (A) and/or the hydrogenated castor oil (A') is 100 parts by mass. From the perspective of particularly enhancing the anti-sagging properties, the content of the surfactant (E) is preferably 40 parts by mass or more when the diamide compound (A) and/or the hydrogenated castor oil (A') is 100 parts by mass.

From comparison among Examples 1 and 73 to 82, it is found that good (C grade or higher) anti-settling properties and thermal stability are exhibited regardless of the type of the second solvent (F), as long as the second solvent (F) has a higher polarity than the first solvent (C).

From comparison among Examples 1 and 83 to 85, the content of the second solvent (F) is preferably 20 mass % or less. The comparison among these examples further shows that, from the perspective of particularly enhancing the thermal stability, the content of the second solvent (F) is found to be more preferably 10 mass % or less. Further, from the perspective of enhancing the anti-settling properties, the content of the second solvent (F) is found to be more preferably 10 mass % or less, and still more preferably 5 mass % or less.

From comparison between Examples 21 and 86, comparison between Examples 53 and 87, comparison between Examples 54 and 88, comparison between Examples 59 and 89, comparison between Examples 64 and 90, comparison between Examples 65 and 91, comparison between Examples 67 and 92, comparison between Examples 43 and 93, comparison between Examples 71 and 94, and comparison between Examples 72 and 95, it is found that adding the rheology control agent according to the examples of the present invention achieves excellent anti-settling properties, thermal stability and anti-sagging properties, not only when the rheology control agent is added to the epoxy resin (Evaluation Formulation 1), but also when the rheology control agent is added to the amine resin (Evaluation Formulation 1b).

On the other hand, as seen from Comparative Examples 1, 6 and 16 in Table 17, using a urethane thickener as the rheology control agent causes poor anti-sagging properties, for example, in the water-based two-component epoxy paint, and poor anti-settling properties and thermal stability in other types of paint.

Further, as seen from Comparative Examples 2 to 4, 7 to 9 and 17 to 19 in Table 17, the anti-settling properties, thermal stability, paint stability over time and anti-sagging properties are inferior when the active matter (X) contains the polyamide compound (B) as a main component and uses a large amount of amine as the neutralizing base.

Here, as seen from Reference Examples 1 to 3 in Table 18, even when the active matter (X) contains the polyamide compound (B) as a main component and uses a large amount of amine as the neutralizing base, the anti-settling properties, thermal stability and anti-sagging properties are good when the rheology control agent is added to the amine resin as in conventional techniques. As described above, there has been a limitation on the rheology control agent that the active matter (X) containing the polyamide compound (B) as a main component and using a large amount of amine as the neutralizing base needs to be added only to the amine resin. However, the rheology control agent according to the present invention does not have such a limitation. That is, according to the present invention, the rheology control agent achieves excellent anti-settling properties and thermal stability, and imparts excellent storage stability and anti-sagging properties to the water-based paint, not only when the rheology control agent is added to the amine resin, but also when it is added to the epoxy resin.

Further, as seen from Comparative Examples 5, 10 and 20 in Table 17, in which a non aqueous non-polar solvent is used as a solvent of the active matter (X), the water-based paint has poor anti-settling properties and thermal stability due to poor dispersion in the water-based paint composition.

Further, as seen from Comparative Example 21 in Table 17, in which the first solvent (C) is not contained, the anti-settling properties and thermal stability are found to be inferior.

The invention claimed is:

1. A rheology control agent for water-based resins, the rheology control agent comprising:

1 mass % or more and 30 mass % or less of an active matter (X) based on a total mass of the rheology control agent, the active matter (X) containing a diamide compound (A) and/or a hydrogenated castor oil (A'), the diamide compound (A) being obtained by reacting a linear or branched diamine component (A1) selected from the group consisting of diamines having 2 to 12 carbon atoms with a monocarboxylic acid component (A2) selected from the group consisting of monocarboxylic acids having at least a hydroxyl group; and 10 mass % or more and 99 mass % or less of a first solvent (C) based on the total mass of the rheology control agent, the first solvent (C) having at least one substituent selected from the group consisting of a hydroxyl group, an ether group, an ester group, an amide group and a ketone group, wherein a total content of the diamide compound (A) and the hydrogenated castor oil (A') is 60 parts by mass or more when a total amount of the active matter (X) is 100 parts by mass, the first solvent (C) is at least one solvent selected from the group consisting of glycol-based solvents, diglycol-based solvents, triglycol-based solvents, ester-based solvents and amide-based solvents, the ester-based solvents are at least one selected from the group consisting of dibasic esters, propylene glycol monomethyl acetate, amyl propionate, ethyl ethoxypropionate, and 2,2,4-trimethyl pentanediol monoisobutyrate, and optionally, the active matter (X) further contains a polyamide compound (B) obtainable by reacting a diamine component (B1) with an excess of a dicarboxylic acid component (B2) relative to the diamine component (B1), the polyamide compound (B) has an acid value of 30 or more and 140 or less, and a content of the polyamide compound (B) is 40 parts by mass or less when a total amount of the active matter (X) is 100 parts by mass.

2. The rheology control agent for water-based resins according to claim 1, wherein the first solvent (C) is a solvent having an HLB value, as calculated by the Davis method, of 3 or more and 10 or less.

3. The rheology control agent for water-based resins according to claim 1, further comprising a nonionic surfactant (E) having an HLB value, as calculated by the Griffin method, of 3 or more and 18.5 or less, wherein a content of the surfactant (E) is 300 parts by mass or less when the diamide compound (A) and/or the hydrogenated castor oil (A') is 100 parts by mass.

4. The rheology control agent for water-based resins according to claim 1, further comprising a second solvent (F) having higher polarity than the first solvent (C), wherein a content of the second solvent (F) is 20 mass % or less based on the total mass of the rheology control agent.

5. The rheology control agent for water-based resins according to claim 1, further comprising water (D), wherein a content of the water (D) is 80 mass % or less based on the total mass of the rheology control agent.

6. A water-based paint composition comprising:

a water-based resin;

a pigment; and a rheology control agent for water-based resins, the rheology control agent including:

1 mass % or more and 30 mass % or less of an active matter (X) based on a total mass of the rheology control agent, the active matter (X) containing a diamide compound (A) and/or a hydrogenated castor oil (A'), the diamide compound (A) being obtained by reacting a linear or branched diamine component (A1) selected from the group consisting of diamines having 2 to 12 carbon atoms with a monocarboxylic acid component (A2) selected from the group consisting of monocarboxylic acids having at least a hydroxyl group; and 10 mass % or more and 99 mass % or less of a first solvent (C) based on the total mass of the rheology control agent, the first solvent (C) having at least one substituent selected from the group consisting of a hydroxyl group, an ether group, an ester group, an amide group and a ketone group, wherein a total content of the diamide compound (A) and the hydrogenated castor oil (A') is 60 parts by mass or more when a total amount of the active matter (X) is 100 parts by mass, the first solvent (C) is at least one solvent selected from the group consisting of glycol-based solvents, diglycol-based solvents, triglycol-based solvents, ester-based solvents and amide-based solvent, the ester-based solvents are at least one selected from the group consisting of dibasic esters, propylene glycol monomethyl acetate, amyl propionate, ethyl ethoxypropionate, and 2,2,4-trimethyl pentanediol monoisobutyrate, and optionally, the active matter (X) further contains a polyamide compound (B) obtainable by reacting a diamine component (B1) with an excess of a dicarboxylic acid component (B2) relative to the diamine component (B1), the polyamide compound (B) has an acid value of 30 or more and 140 or less, and a content of the polyamide compound (B) is 40 parts by mass or less when a total amount of the active matter (X) is 100 parts by mass.

7. The water-based paint composition according to claim 6, wherein the first solvent (C) is a solvent having an HLB value, as calculated by the Davis method, of 3 or more and 10 or less.

8. The water-based paint composition according to claim 6, wherein the rheology control agent further includes a nonionic surfactant (E) having an HLB value, as calculated by the Griffin method, of 3 or more and 18.5 or less, wherein a content of the surfactant (E) is 300 parts by mass or less when the diamide compound (A) and/or the hydrogenated castor oil (A') is 100 parts by mass.

9. The water-based paint composition according to claim 6, wherein the rheology control agent further includes a second solvent (F) having higher polarity than the first solvent (C), wherein a content of the second solvent (F) is 20 mass % or less based on the total mass of the rheology control agent.

10. The water-based paint composition according to claim 6, wherein the rheology control agent further includes water (D), wherein a content of the water (D) is 80 mass % or less based on the total mass of the rheology control agent.

11. The water-based paint composition according to claim 6, wherein a content of the active matter (X) in the rheology control agent for water-based resins is 0.1 mass % or more and 1.0 mass % or less of a total solid content of the water-based paint composition.

\* \* \* \* \*